(12) United States Patent
Sanada et al.

(10) Patent No.: US 8,672,465 B2
(45) Date of Patent: **\*Mar. 18, 2014**

(54) WATER-BASED INK, INK JET RECORDING METHOD, INK CARTRIDGE, RECORDING UNIT, INK JET APPARATUS, AND IMAGE FORMING METHOD

(75) Inventors: Mikio Sanada, Kanagawa (JP);
Katsuhiko Takahashi, Kanagawa (JP);
Masashi Ogasawara, Tokyo (JP);
Tomonari Watanabe, Kanagawa (JP);
Yui Tokuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/191,511

(22) Filed: Jul. 27, 2011

(65) Prior Publication Data

US 2011/0277663 A1 Nov. 17, 2011

Related U.S. Application Data

(60) Continuation of application No. 11/931,985, filed on Oct. 31, 2007, now Pat. No. 8,007,097, which is a division of application No. 10/874,347, filed on Jun. 24, 2004, now Pat. No. 7,371,274, which is a continuation of application No. PCT/JP03/16942, filed on Dec. 26, 2003.

(30) Foreign Application Priority Data

| Dec. 27, 2002 | (JP) | ................................. 2002-382045 |
| May 2, 2003 | (JP) | ................................. 2003-127476 |
| May 2, 2003 | (JP) | ................................. 2003-127599 |
| Dec. 22, 2003 | (JP) | ................................. 2003-425520 |

(51) Int. Cl.
*B41J 2/01* (2006.01)

(52) U.S. Cl.
USPC ............................. 347/100; 347/95; 347/101

(58) Field of Classification Search
USPC ......... 347/100, 95, 96, 101, 102, 103, 88, 99; 106/31.13, 31.6, 31.27; 523/160, 161
See application file for complete search history.

(56) References Cited

U.S. PATENT DOCUMENTS 5,091,004 A 2/1992 Tabayashi et al.
5,993,524 A * 11/1999 Nagai et al. .................. 106/31.6
(Continued)

FOREIGN PATENT DOCUMENTS

| EP | 0439153 A2 | 7/1991 |
| EP | 0913438 A1 | 5/1999 |

(Continued)

*Primary Examiner* — Manish S Shah
(74) *Attorney, Agent, or Firm* — Fitzpatrick, Cella, Harper & Scinto

(57) ABSTRACT

A water-based ink of the present invention includes water, a plurality of different water-soluble organic solvents, and a water-insoluble coloring material, wherein the above water-soluble organic solvents consist of a good solvent to the above water-insoluble coloring material and a poor solvent to the above water-insoluble coloring material, and the total amount (% by mass) of the good solvents in the ink is represented by A and the total amount (% by mass) of the poor solvent in the ink is represented by B, the ratio of A to B ranges from 10:5 to 7:9 both inclusive, and when the respective Ka values of the above water-soluble organic solvents are determined by the Bristow method and compared with each other, a water-soluble organic solvent having the largest Ka value is the poor solvent. The pigment ink has a sufficiently large area factor even with a small amount of ink and provides an image of high OD.

18 Claims, 9 Drawing Sheets

(56) References Cited

U.S. PATENT DOCUMENTS

| | | | |
|---|---|---|---|
| 6,174,354 B1 | 1/2001 | Takizawa et al. | |
| 6,221,141 B1 | 4/2001 | Takada et al. | |
| 6,280,513 B1 | 8/2001 | Osumi et al. | |
| 6,332,919 B2 | 12/2001 | Osumi et al. | |
| 6,375,317 B1 | 4/2002 | Osumi et al. | |
| 6,387,168 B1 | 5/2002 | Koitabashi et al. | |
| 6,425,662 B1 | 7/2002 | Teraoka et al. | |
| 6,511,534 B1 | 1/2003 | Mishina et al. | |
| 6,521,034 B1 | 2/2003 | Osumi et al. | |
| 6,547,381 B2 | 4/2003 | Watanabe et al. | |
| 6,688,716 B2 | 2/2004 | Kanda et al. | |
| 6,706,105 B2 | 3/2004 | Takada et al. | |
| 6,719,402 B2 | 4/2004 | Nakagawa et al. | |
| 6,849,111 B2 * | 2/2005 | Suzuki et al. | 347/100 |
| 7,160,376 B2 | 1/2007 | Watanabe et al. | |
| 8,007,097 B2 * | 8/2011 | Sanada et al. | 347/100 |
| 2001/0020431 A1 | 9/2001 | Osumi et al. | |
| 2002/0059883 A1 * | 5/2002 | Takada et al. | 347/100 |
| 2002/0063750 A1 | 5/2002 | Kanda et al. | |
| 2002/0070997 A1 | 6/2002 | Nakagawa et al. | |
| 2004/0231554 A1 | 11/2004 | Udagawa et al. | |

FOREIGN PATENT DOCUMENTS

| | | |
|---|---|---|
| EP | 0943666 A2 | 9/1999 |
| EP | 1085062 A2 | 3/2001 |
| EP | 1167468 A1 | 1/2002 |
| EP | 1167470 A1 | 1/2002 |
| EP | 1167473 A1 | 1/2002 |
| EP | 1172225 A2 | 1/2002 |
| EP | 1188804 A1 | 3/2002 |
| JP | 10-330665 A | 12/1998 |
| JP | 11-217529 A | 8/1999 |
| JP | 2000-063719 A | 2/2000 |
| JP | 2000-198955 A | 7/2000 |
| JP | 2001-011348 A | 1/2001 |
| JP | 2001-115069 A | 4/2001 |
| JP | 2002-166534 A | 6/2002 |
| JP | 2002-166536 A | 6/2002 |
| JP | 2002-327138 A | 11/2002 |
| WO | 01/51566 A1 | 7/2001 |

* cited by examiner

COMPARATIVE EXAMPLE 18

EXAMPLE 6

COMPARATIVE EXAMPLE 19

COMPARATIVE EXAMPLE 20

EXAMPLE 6

DISTRIBUTION DEPTH OF INSOLUBLE COLORING MATERIAL

PAPER CROSS SECTION

COMPARATIVE EXAMPLE 20

DISTRIBUTION DEPTH OF INSOLUBLE COLORING MATERIAL

PAPER CROSS SECTION

WATER-BASED INK, INK JET RECORDING METHOD, INK CARTRIDGE, RECORDING UNIT, INK JET APPARATUS, AND IMAGE FORMING METHOD

This application is a continuation of U.S. patent application Ser. No. 11/931,985, filed Oct. 31, 2007 now U.S. Pat. No. 8,007,097, which is a divisional of U.S. patent application Ser. No. 10/874,347, filed Jun. 24, 2004, which issued as U.S. Pat. No. 7,371,274 on May 13, 2008, which is a continuation of International Application No. PCT/JP03/16942, filed on Dec. 26, 2003, which claims the benefit of Japanese Patent Application Nos. 2002-382045, filed on Dec. 27, 2002; 2003-127476, filed on May 2, 2003; 2003-127599, filed on May 2, 2003; and 2003-425520 filed on Dec. 22, 2003.

BACKGROUND OF THE INVENTION

1. Field of the Invention

The present invention relates to a water-based ink that comprises a water-insoluble coloring material. More specifically, the present invention relates to a water-based ink, which is preferably used for a recording method and a recording apparatus using an ink jet recording system, and further in an ink jet image forming method.

2. Related Background Art

It is known that ink containing a water-insoluble coloring material such as a pigment (pigmented ink) can provide images excellent in fastness such as water resistance or light resistance. In recent years, various techniques have been proposed to improve the optical density of an image formed with such ink. For example, there has been proposed a method for further improving image density, using an ink containing a self-dispersing carbon black and a certain salt (refer to, e.g., Japanese Unexamined Patent Publication No. 2000-198955). There has been also proposed a technique to form a high quality image, in which an ink composition for ink jet recording, containing a pigment, a polymer particle, a water-soluble organic solvent and water, is applied to a recording medium with an aqueous solution containing a polyvalent metal to cause reaction between the ink composition and the polyvalent metal in the aqueous solution (see e.g., Japanese Unexamined Patent Publication No. 2000-63719). In these techniques, a pigment present dispersed in the ink is forced to agglomerate on the surface of the recording medium to prevent penetration of the pigment into the recording medium whereby an image of a higher density than with conventional pigmented ink can be obtained.

However, as a result of intensive studies, the present inventors found out that, as the pigment particles are agglomerate on a recording medium in the above techniques, the area on the surface of a recording medium to be covered with the coloring material when a certain amount of the ink droplet is used (so-called area factor) tends to be insufficient. This means that the above techniques require more ink to obtain the same image density in comparison with the conventional pigmented ink in which a pigment is dispersed by a polymer dispersant or the like. This point needs further improvement. Although there is a method of obtaining a large area factor with a small ink droplet by increasing permeability of the ink to a recording medium, the ink of increased permeability diffuse not only on the surface of the recording medium but also into the inside thereof, resulting in insufficient image density.

The present inventors studied both advantages and disadvantages of the conventional inks and analyzed the characteristics of the images formed with such inks. They have found that, when an ink contains a coloring material in a larger amount, there arise such problems that coloring material remains in a larger amount on the surface of the recording medium, visually uneven dots are formed, or the coloring material is not effectively used but wasted in the recording medium. The present inventors have found that images superior to the conventional images can be obtained by solving at least one of these technical problems summarized below. The present invention solves at least one of the following problems.

(1) When a pigment which exists in the state of dispersion in an ink is forced to agglomerate on the surface of a recording medium, the area of the surface of the recording medium which the coloring material can cover with an ink droplet of a predetermined volume (so-called area factor) might be insufficient. In this case, the amount of ink necessary to obtain the same image density increases.

(2) When the ink permeability is increased, the ink spreads not only on the surface of a recording medium but also permeates in a direction of the thickness of the recording medium. Accordingly, the coloring material cannot distribute at a high density near the surface of the recording medium, and a high image density cannot be obtained.

Thus, an object of the present invention is to provide a water-based ink, which can provides sufficient area even with a small droplet of pigmented ink (large area factor), can provide an image having high OD (image density), and has a long-term storage stability.

Another object of the present invention is to provide an ink jet recording method of using the above ink to form a high-definition image with high OD with a small amount of the ink.

Another object of the present invention is to provide an ink cartridge, a recording unit, and an ink jet recording apparatus, which are preferably used for the above recording method.

Further, another object of the present invention is to provide an image forming method in which color mixing (bleeding) is effectively prevented on the border between a black ink region and a color ink region without causing feathering, when a color image in which different colors are adjacent to one another is recorded on a plain paper.

The technical concept of the present invention can be summarized as follows: a water-based ink that comprises water, a plurality of different water-soluble organic solvents, and a water-insoluble coloring material, wherein the above water-soluble organic solvents are a good solvent and a poor solvent for the water-insoluble coloring material to be used, and when Ka values of the above water-soluble organic solvents are determined by the Bristow method, the above poor solvent has the largest Ka value and diffuses along the surface of a recording medium in the form of substantially a perfect circle before the good solvent diffuses, assisting agglomeration of the above water-insoluble coloring material in the diffusion process. By this structure, the water-based ink of the present invention has an advantage that it is not necessary to contain a large amount of the coloring material that is diffused and wasted in a recording medium without contributing to image density as in the prior art. In addition, an image can be formed in an ideal state, that is, much of the coloring material is not located on the surface of a recording medium and at the same time the coloring material does not reach the back side of the recording medium thereby enabling printing on the both sides. As a result, an image with a high density is uniformly formed on the surface of the recording medium.

SUMMARY OF THE INVENTION

The above-described objects are achieved by the present invention mentioned below. That is to say, a water-based ink according to one aspect of the present invention comprises water, a plurality of different water-soluble organic solvents, and a water-insoluble coloring material, wherein the above water-soluble organic solvents consist of a good solvent to the above water-insoluble coloring material and a poor solvent to the above water-insoluble coloring material, and when the total amount (% by mass) of the good solvents in the ink is denoted as A and the total amount (% by mass) of the poor solvents in the ink is denoted as B, the ratio of A to B ranges from 10:5 to 10:30 both inclusive, and when Ka values of the above water-soluble organic solvents are determined by the Bristow method and the obtained values are compared with each other, the water-soluble organic solvent having the largest Ka value is a poor solvent.

In addition, a water-based ink according to another aspect of the present invention comprises water, a plurality of different water-soluble organic solvents, and a water-insoluble coloring material, wherein the above water-soluble organic solvents consist of a good solvent to the above water-insoluble coloring material and a poor solvent to the above water-insoluble coloring material, and when Ka values of the above water-soluble organic solvents are determined by the Bristow method and the obtained values are compared with each other, the water-soluble organic solvent having the largest Ka value is a poor solvent, this is further characterized in that the attaching state of this water-based ink to a plain paper is defined as follows: when the ink is dropped to a plain paper by using a needle with a needle diameter of 28 G (inner diameter: 0.18 mm, and outer diameter: 0.36 mm) positioned at a height of 4 mm above the surface of the plain paper, and fixed on the surface, the measurement value of a diameter of an ink dot obtained immediately after the ink impacted the plain paper denoted by dI, the measurement value of the largest diameter of the spread of the ink after the ink fixed on the plain paper denoted by dS, and the measurement value of the largest diameter of the spread of the water-insoluble coloring material in the ink after the ink fixed on the plain paper denoted by dC satisfy a relationship shown below (Formula 1):

$$dC < dI < dS \quad \text{(Formula 1)}$$

and the penetration depth of the water-insoluble coloring material to the plain paper is less than 30 µm after the ink is printed by the ink jet recording and fixed on the plain paper.

Moreover, in another aspect of the present invention, there is provided an ink jet recording method, which is characterized by a step of ejecting the water-based ink having the above structure by the ink jet method.

Furthermore, in another aspect of the present invention, there are provided: an ink cartridge for storing the water-based ink having the above structure; a recording unit comprising an ink storing unit for storing the water-based ink having the above structure and an ink jet head for ejecting the ink; and an ink jet recording apparatus comprising an ink storing unit for storing the water-based ink having the above structure and an ink jet head for ejecting the ink.

Still further, in another preferred aspect of the present invention, there is provided an image forming method for ink jet recording on a plain paper using a black ink and at least one water based color ink, characterized in that the water-based ink having the above structure is used as a black ink, and when an image in which an image formed with the black ink and an image formed with a color ink are adjacent to is formed, the image is formed by scanning for attaching the black ink to a black image, and then scanning for attaching the color ink to a region in which the black image has been formed.

Still further, in another aspect of the present invention, there is provided a water-based ink, which comprises water, a plurality of different water-soluble organic solvents, and a water-insoluble coloring material, wherein the above water-soluble organic solvents consist of a good solvent to the above water-insoluble coloring material and a poor solvent to the above water-insoluble coloring material, and when largest Ka values of the above water-soluble organic solvents are determined by the Bristow method, a water-soluble organic solvent having the greatest Ka value is the poor solvent, and the poor solvent permeates a recording medium before the good solvent does, so that it assists agglomeration of the above water-insoluble coloring material in the good solvent on the surface of the recording medium.

Effect of the Invention

According to the present invention, there is provided a water-based ink that is a pigmented ink, which has a sufficiently large area factor even from a small amount of ink droplets and provides an image with high OD (image density). In addition, according to the present invention, using such an ink, there are provided: an ink jet recording method for forming a high definition image with high OD even from a small additive amount of ink; an ink cartridge preferably used for the above recording method; a recording unit; and an ink jet recording apparatus. Moreover, according to the present invention, there is provided an image forming method in which color mixing (bleeding) is effectively prevented on the border between a black ink region and a color ink region without causing feathering, when a colored image in which different colors are adjacent to each other on a plain paper.

DESCRIPTION OF THE PREFERRED EMBODIMENTS

Figure 1:
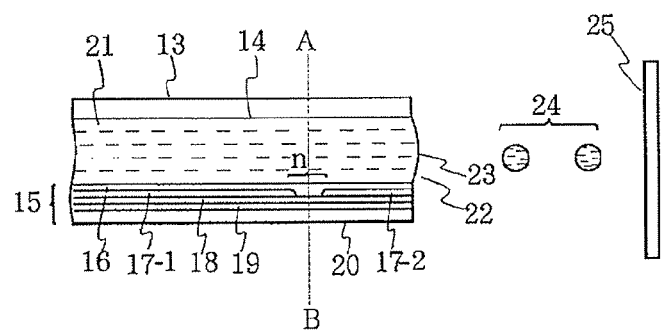
FIG. 1 is a longitudinal sectional view of an ink jet recording apparatus head.

The present invention will be described further in detail below, referring to preferred embodiments. First, a poor solvent and a good solvent used in the present specification are explained. The detailed definitions will be described later, but here, a water-soluble organic solvent causing stable dispersion of the water-insoluble coloring material therein is called a good solvent, and a water-soluble organic solvent causing unstable dispersion of the water-insoluble coloring material therein is called a poor solvent, regardless of the method of dispersing a water-insoluble coloring material. The inventors of the present invention paid attention to water-soluble organic solvents contained in a water-based ink together with a water-insoluble coloring material, and classified them into good solvents having a high ability to dissolve or disperse the water-insoluble coloring material and poor solvents having a poor ability of dissolving or dispersing the coloring material. The present invention is characterized in that a water-based ink is designed such that the ratio between the poor solvent and the good solvent in the ink is set within a certain range. By adopting such a structure, an image with reduced feathering and bleeding can be obtained even on a plain paper having various problems in image formation with conventional water-based ink. The present invention provides an ink having a sufficiently large area factor (forms a large area with a small amount of ink droplets) and being capable of forming an image with high OD. Furthermore, the use of such ink enables high-speed printing, down-sizing of the recording apparatus, and cost reduction including consumable supplies, and further, it realizes images of excellent fastness and higher print density. Finding out remarkable effects such as formation of high quality images, the inventors completed the present invention.

The reason why such advantages can be obtained by the present invention is not fully understood, but the present inventors speculate as follows. In general, when an image is formed with a water-based ink on a recording paper such as plain paper, it is necessary to make the coloring material stay on the paper efficiently in order to realize high print density and print quality. As a method of doing so, there is a method of attaching a reaction solution to a recording medium and then attaching a pigmented ink to the recording paper, so as to obtain an excellent print density and print quality. There is also a method of using a special dispersant to achieve both the storage stability of ink and a high print density. However, according to studies of the present inventors, it is still difficult to obtain a sufficient print density by these methods. In particular, it is impossible to have a sufficiently large area factor with a small ink droplet as well as obtaining a high print density.

The water-based ink of the present invention comprises at least water, a water-insoluble coloring material, and a plurality of different water-soluble organic solvents. The above water-soluble organic solvents include a good solvent to the above water-insoluble coloring material and a poor solvent to the above water-insoluble coloring material. When the water-based ink is in a liquid state where water, a water-insoluble coloring material and water-soluble organic solvents including both a good solvent and a poor solvent to the water-insoluble coloring material are mixed at a certain ratio, the storage stability of the water-insoluble coloring material such as a pigment is maintained.

Figure 14A:
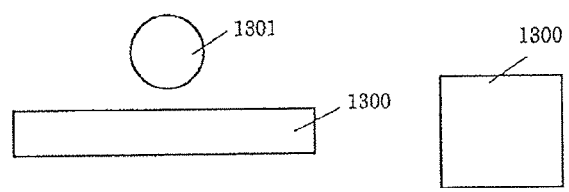
FIGS. 14A, 14B, 14C and 14D schematically illustrate the states when an ink droplet of the present invention landed on the surface of a recording medium.

When such a water-based ink of the present invention is printed on a recording medium, and particularly on a plain paper, an extremely excellent print density and print quality can be obtained. The reason is speculated as follows: as shown in FIG. 14A, when an ink droplet 1301 of the present invention is applied on a recording medium 1300 such as a plain paper, the component ratio of water, a water-insoluble coloring material, and a good solvent and a poor solvent to the water-insoluble coloring material contained in the ink changes after the ink landed on the recording medium. That is, as shown in FIGS. 14A and 14B, after the ink droplet 1301 landed on the surface of the recording medium 1300, as the ink is fixed to the recording medium, a poor solvent 1307 having a high Ka value diffuses first among the water-soluble organic solvents with evaporation of water, in the vicinity of the surface of the recording medium, in the form of substantially a perfect circle, and then a good solvent with a low Ka value diffuses, so that an ink dot is formed.

Figure 14B:
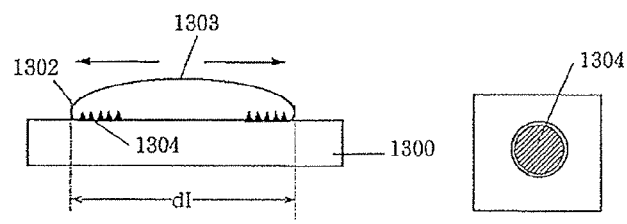
Figure 14C:
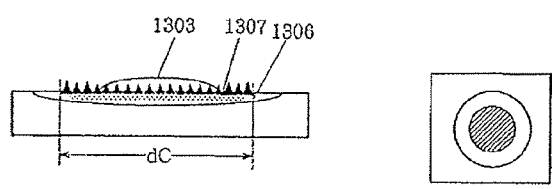
Figure 14D:
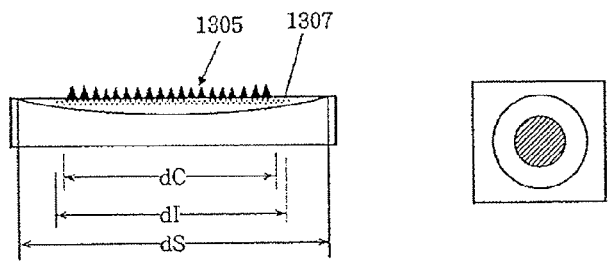

FIGS. 14B to 14D schematically show the states of the ink after it landed on the recording medium 1300 until it is fixed thereto. When the spread of an ink dot in this case is considered, the concentration of the poor solvent must be high at a periphery 1302 of a dot where the ink and the paper are in contact than at a center 1303 of the dot. As a result, when the ink dot diffuses along the surface of the recording medium in the form of substantially a perfect circle, the concentration of the poor solvent 1307 sharply increases, the water-insoluble coloring material becomes unstable so that agglomeration of the coloring material or destruction of the dispersion state occurs. As a result, forming an outline that is substantially a perfect circle on the surface of the paper (refer to FIG. 14B), the water-insoluble coloring material 1304 stays near the surface of the recording medium 1300, and a bank of the water-insoluble coloring material is formed on the periphery of the dot. In such a manner, it is considered that the dot of the water-insoluble coloring material is formed in the form of a perfect circle, and that the dot is immobilized on the paper in that state (refer to FIG. 14C). The dot formation with the water-insoluble coloring material is completed at this point, but the water-soluble organic solvents and water contained in the ink still diffuse and spread in a radial form. That is to say, even after the dot formation with the water-insoluble coloring material, water and water-soluble organic solvents diffuse along the surface of the recording medium. Subsequently, the water-soluble organic solvents evaporate from or penetrate into the recording medium at the center 1303 where the good solvent is rich, and the water-insoluble coloring material also precipitates in this area, so that a dot 1305 for image formation is made (refer to FIGS. 14A to 14D). An ink image formed by the above-described process has a sufficiently large area factor even from a small amount of ink droplets and has a high print density. Moreover, since generation of feathering is sufficiently reduced, a high quality image can be obtained.

Under the above-assumed mechanism, the good solvent and poor solvent used in the present invention are determined by the condition whether or not it can favorably maintain the dispersed state of the water-insoluble coloring material. That is to say, the good solvent or poor solvent is determined depending on their relationship with the water-insoluble coloring material or a dispersant thereof. Accordingly, when a good solvent and a poor solvent are selected to prepare the ink of the present invention, it is preferable to observe the dispersed state or stability of a water-insoluble coloring material to be used with the solvent, so as to select the good and poor solvents based on the results of the observation. The present inventors conducted various studies regarding the criterion for determining good and poor solvents that provide the effects of the present invention based on the relationship with the effects of the present invention. A solution containing approximately 50% by mass of a solvent to be determined and a water-insoluble coloring material to be used for the ink in a dispersed state was held at 60° C. for 48 hours. A particle size in the above solution was compared with that of another pigment dispersion solution containing the same pigment but none or little of the solvent to be determined. If the particle size of the test solution becomes larger, the solvent was determined being a poor solvent, and if it was almost the same or smaller, a good solvent. The present inventors found out that the above definitions have extremely good consistency with the effects of the present invention.

More specifically, whether a solvent is a good solvent or a poor solvent to a specific water-insoluble coloring material was determined as follows. First, the following two water-insoluble coloring material dispersion solutions A and B were prepared:

A: a water-insoluble coloring material dispersion solution containing 50% by mass of a water-soluble organic solvent to be determined, 5% by mass of a water-insoluble coloring material or a total of a water-insoluble coloring material and a substance for dispersing thereof, and 45% by mass of water; and B: a water dispersion solution containing 5% by mass in total of the water-insoluble coloring material and the substance for dispersion thereof, but not the water-soluble organic solvent.

Subsequently, the above dispersion solution A was maintained at 60° C. for 48 hours and then cooled to ordinary temperature. The particle size of the dispersion solution A was measured with a rich solution particle size analyzer (Product name: FPAR-1000; manufactured by Otsuka Electronics Co., Ltd.). Likewise, the particle size of the above water dispersion solution B was measured with the above rich solution particle size analyzer. Thereafter, the values of the particle sizes of the above dispersion solution A and water dispersion solution B are denoted by a particle size (A) and a particle size (B), respectively, and with these values whether the solvent was a good solvent or a poor solvent was determined in accordance with definitions described below. And, an ink having the structure of the present invention was prepared using the thus determined good solvent and poor solvent to confirm that the above-described excellent effects were obtained. Regarding the criteria for good solvent and poor solvent, when the particle size (A) is larger than the particle size (B) in the above descriptions, the water-soluble organic solvent is called a poor solvent. When the particle size (A) is the same as or smaller than the particle size (B), the water-soluble organic solvent is called a good solvent.

The water-based ink of the present invention may have the same composition as that of the conventional water-based ink containing a water-insoluble coloring material with the exception that water-soluble organic solvents have the above-described specific features. That is to say, the first feature of the water-based ink of the present invention is that it comprises water, a plurality of water-soluble organic solvents, and a water-insoluble coloring material, wherein the water-soluble organic solvents include at least one good solvent and at least one poor solvent that are determined by the above-described determination method, and when Ka values of these water-soluble organic solvents are determined by the Bristow method and the obtained values are compared with each other, the water-soluble organic solvent having the largest Ka value is a poor solvent. As a consequence, dispersion stability of the water-insoluble coloring material in the ink becomes extremely excellent, and at the same time. it has a sufficiently large area factor even with a small ink droplet and exhibits a high print density when printed on a recording medium, particularly on plain paper, enabling formation of an image with an extremely excellent print quality.

Next, the Ka value determined by the Bristow method is explained. This value is used as an index of permeability of an ink into a recording medium. Taking the case of a liquid ink as an example, when the permeability of the ink is represented by V, an ink amount per 1 $m^2$, the amount of the ink permeated the recording medium V ($mL/m^2$=μm) after a certain time t has passed after the ejection of an ink droplet is represented by the following Bristow's formula:

$$V=Vr+Ka(t-tw)^{1/2}$$

Herein, immediately after the ink droplet is applied to the surface of the recording medium, almost all of the ink is absorbed in uneven portions on the surface of the recording medium (rough portions on the surface of the recording medium), and almost no ink permeates the internal part of the recording medium. The time when almost no ink permeates the internal part of the recording medium is referred to as a contact time (tw), and the amount of the ink absorbed in uneven portions on the recording medium during the contact time is referred to as Vr. When the time elapsing after attachment of the ink exceeds the contact time, the amount of the ink permeated the recording medium increases with the extra time exceeding the contact time, that is, by the amount that is proportional to $(t-tw)^{1/2}$. Ka represents a proportionality constant of this increased amount, and it indicates a value corresponding to the permeation rate. The Ka value can be measured by the Bristow method, using a test set for dynamic permeability of fluids (for example, Product name: Dynamic Permeability Tester S; manufactured by Toyo Seiki Seisaku-sho, Ltd.) or the like.

Moreover, when the total amount (% by mass) of the good solvent in the water-based ink of the present invention is represented by A and the total amount (% by mass) of the poor solvent in the ink is represented by B, the water-based ink of the present invention is adjusted such that the ratio of A to B [the total amount (% by mass) of the good solvent in the ink to the total amount (% by mass) of the poor solvent in the ink] is set within the range between 10:5 or more and 10:30 or less. It is to be noted that the term "total amount" is used herein to mean that when plural good solvents exist, for example, all of the good solvents are included. In addition, the expression "the ratio of A to B is between 10:5 or more and 10:30 or less" is used herein to mean that when A is 10, B is between 5 and 30 both inclusive.

Furthermore, in another aspect of the present invention, there is provided a water-based ink comprising water, a plurality of different water-soluble organic solvents, and a water-insoluble coloring material, wherein the above water-soluble organic solvents consist of a good solvent to the above water-insoluble coloring material and a poor solvent to the above water-insoluble coloring material, and when Ka values of the above water-soluble organic solvents are determined by the Bristow method and the obtained values are compared with each other, a water-soluble organic solvent having the largest Ka value is the poor solvent, and further wherein the adhesive behavior of the ink to a plain paper is as described below.

It was found that when the water-based ink of the present invention having the above structure was fixed on a plain paper, it showed a behavior that was different from the conventional ink. Such a behavior enables the ink to have a sufficiently large area factor even with a small amount of ink droplets and to achieve the formation of an image with high OD (reflection density). Moreover, when a color image in which different color regions are adjacent to one another is recorded on a plain paper, an effect of preventing feathering can be obtained. In other words, whether or not it is the ink of the present invention providing the above remarkable effects can be determined by measuring the behavior of the ink when the ink fixed on a plain paper according to the following method.

In order to measure the behavior of a water-based ink towards a plain paper, first, a needle with a diameter of 28 G (inner diameter: 0.18 mm, and outer diameter: 0.36 mm) is used, and the tip of the needle is located at a height of 4 mm from the surface of a plain paper and the ink is then dropped from the height. Then, the ink is fixed on the surface of the paper. While, the diameter of an ink dot is measured immediately after the ink landed onto the plain paper and the measured value is represented by dI, and the largest diameter of the spread of the ink after the ink is fixed on the plain paper is measured, and the measured value is represented by dS. Also the largest diameter of the spread of the water-insoluble coloring material in the ink after the ink fixed on the plain paper is measured, and the measured value is represented by dC. In the case of the water-based ink of the present invention, the above obtained measurement values are in a relationship of dC<dI<dS (Formula 1). In addition, the penetration depth of the water-insoluble coloring material into the plain paper is less than 30 μm after the ink is printed and fixed on the plain paper by ink jet recording.

The above Formula 1 means that the largest diameter dC of the spread of the water-insoluble coloring material in the ink shown in FIG. 14C is smaller than the diameter dI of the ink dot measured immediately after the ink landed, which is shown in FIG. 14B, and the largest diameter dS of the spread of the ink after the ink fixed on the recording medium shown in FIG. 14D is larger than dI.

Taking into consideration the structure of the water-based ink of the present invention, the above relational expression means that after an ink droplet is applied onto a recording medium, owing to the poor solvent with a high Ka value, the coloring material diffuses and fixes in the vicinity of the surface of the recording medium in the form of substantially a perfect circle, and that the water and water-soluble organic solvents contained in the ink further diffuse radially in the vicinity of the surface of the recording medium, and that the water-insoluble coloring material is first immobilized and then the water and water-soluble organic solvents diffuses into the recording medium. Moreover, a feature that the penetration depth of the water-insoluble coloring material after the ink fixed on the recording medium is less than 30 μm means that when the water-insoluble coloring material is applied to the recording medium, it effectively covers the surface of the recording medium.

In contrast, when the behavior of a conventional water-based ink to a plain paper is measured in the same manner, the largest diameter dC of the spread of the water-insoluble coloring material in the ink after the ink fixed on a plain paper becomes greater than the diameter dI of the ink dot measured immediately after the ink landed on a plain paper, and the relationship thereof is expressed as dI<dC<dS. Moreover, the border between the region of water-insoluble coloring material and that of the water and water-soluble organic solvents spreading therearound becomes unclearer than that with the water-based ink of the present invention. This shows that with a conventional ink when the water and water-soluble organic solvents diffuse in the recording medium after the ink landed on a plain paper, the water-insoluble coloring material also spreads together with them, thereby the coloring material cannot effectively cover the paper surface. Moreover, it also shows that since the outline of the coloring material is not a perfect circle, printing also becomes unclear. Furthermore, even when the relationship dC<dI<dS can hold among dC, dI, and the largest diameter dS of the spread of the ink after the ink fixed on the recording medium, if the penetration depth of the water-insoluble coloring material after the ink fixation is 30 μm or greater, the water-insoluble coloring material does not only diffuse in the vicinity of the surface of the paper, but also permeates in a depth direction of the paper. This case also shows that the coloring material does not effectively cover the paper.

In the present invention, dI, dS and dC as defined above are measured according to the following methods.

First, a small amount of a water-soluble dye, which is soluble in water-soluble organic solvents contained in the ink to be measured and has a hue different from that of the water-insoluble coloring material being a constituent of the ink, was added to the ink, and using the thus obtained ink, the largest diameter dS of the spread of the ink after the ink was fixed on the plain paper could be measured by visual observation. That is to say, by adding a small amount of a water-soluble dye, which is soluble in water-soluble organic solvents contained in an ink to be measured and has a hue different from that of the water-insoluble coloring material being a constituent of the ink, the spreading condition of water and water-soluble organic solvents that diffuse in a plain paper after the water-insoluble coloring material in the ink fixed can be confirmed by visual observation due to the presence of the above water-soluble dye added to the ink.

The diameter dI of the ink dot immediately after the ink droplet landed on a plain paper was measured using Face CONTACT-ANGLEMETER CA-P manufactured by Kyowa Interface Science Co., Ltd. More specifically, using a needle with a needle diameter of 28 G (inner diameter: 0.18 mm, and outer diameter: 0.36 mm), the tip of the needle was located at a height of 4 mm from the surface of the plain paper, ink was then dropped from the height onto the plain paper, and after the dropping, the diameter of an ink droplet was read from the scale of the contact anglemeter, thereby measuring the value of dI. That is, the above read value represents the ink dot diameter dI immediately after the ink impacts a plain paper.

The largest diameter dS of the spread of the ink after the ink fixed on a plain paper, and the largest diameter dC of the spread of the water-insoluble coloring material in the ink after the ink fixed on a plain paper, were measured as follows. The ink dot dropped on a plain paper under the above-described conditions was left for 6 hours or more, and after the ink droplet was stabilized, the dimension of the ink dot was measured. The largest diameter dS of the spread of the ink after the ink was fixed on a plain paper was obtained by measuring the largest linear dimension of the spread hue of a water-soluble dye having a hue different from that of the water-insoluble coloring material contained in the ink. Still further, the largest diameter dC of the spread of the water-insoluble coloring material in the ink after the ink was fixed on a plain paper was obtained by measuring the largest linear dimension of the spread having the hue of the water-insoluble coloring material contained in the ink.

Still further, penetration depth of the water-insoluble coloring material after the ink was fixed on a plain paper was obtained by cross-sectioning the printing area of the plain paper after printing with an ink jet printer and then observing the cross section with a microscope.

In order that an ink dot has such a form, when the total amount (% by mass) of the good solvent(s) in the ink is denoted by A and the total amount (% by mass) of the poor solvent(s) in the ink is denoted by B, the ratio of the ratio of A to B [the total amount (% by mass) of the good solvent(s) in the ink: the total amount (% by mass) of the poor solvent(s) in the ink] is preferably within the range between 10:5 or more and 10:30 or less, more preferably within the range between 10:5 or more and 10:10 or less, and particularly preferably within the range between 10:6 or more and 10:10 or less.

The water-based ink of the present invention is characterized in that when Ka values of the plurality of different types of water-soluble organic solvents contained in the ink are determined by the Bristow method and the obtained values are compared with each other, the water-soluble organic solvent having the largest Ka value is a poor solvent. Moreover, according to studies of the present inventors, in order to achieve further improvement of the quality of the recorded image, the ink is preferably adjusted such that the Ka value becomes less than 1.5 $(ml/m^2/msec^{1/2})$, more preferably 0.2 $(ml/m^2/msec^{1/2})$ or more but less than 1.5 $(ml/m^2/msec^{1/2})$. That is to say, if the ink is constituted to have a Ka value less than 1.5 $(ml/m^{21}\ msec^{1/2})$, solid-liquid separation takes place at an early stage of the process where the ink permeates a recording medium, so that a high-quality image with very little feathering can be formed. At the same time, by adjusting the Ka value of the ink to 0.2 $(ml/m^2/msec^{1/2})$ or more, more preferable ability of fixation can be obtained.

It is noted that the Ka value determined by the Bristow method in the present invention was measured using, as a recording medium, a plain paper [e.g., PB paper used for an electrophotographic copying machine, page printer (laser beam printer) or ink jet printer manufactured by Canon Inc., or PPC paper used for an electrophotographic copying machine]. The measuring environment was designed assuming an ordinary office environment such as a temperature between 20° C. and 25° C. and a humidity between 40% and 60%.

By the way, when an image is formed with both black and color inks on a plain paper, if the water-based ink of the present invention is used as a black ink as described above, it is considered that the agglomeration or disruption of the dispersion of the coloring material constituting the black ink progresses faster than the case of other inks. In the image forming method of the present invention, the water-based ink of the present invention is used as a black ink, and the formation of an image with a color ink is carried out after the formation of an image with the black ink, and more preferably, scanning for attaching the black ink is carried out, and after at least an interval of a single scanning, scanning for attaching the color ink is carried out. By adopting such a process, even when the black ink comes into contact with the color ink, color mixing or bleeding between the black ink and the color ink does not occur on the paper, thereby achieving excellent anti-bleeding in the print. That is to say, according to the present invention, the above-described excellent effects can be achieved by only carrying out image formation with each of black and color inks with a certain time interval, dispensing with a multipass printing method of plural scanning which needs a long printing time, or a method of using different recovery systems for black and color inks which leading to up-sizing in the apparatuses.

Moreover, when the water-based ink of the present invention is used, since the coloring material contained in the ink efficiently remains on a recording medium for the reasons described above, it becomes possible to conduct high-density printing with a small ejected amount of the ink (droplet volume) than that of the conventional ink. Furthermore, since printing can be conducted with a smaller amount of ink, effects such as cost reduction in image formation or achievement of a faster fixation time in comparison with the conventional ink, can be obtained.

The water-based ink of the present invention is characterized in that the water-soluble organic solvents contained in the ink are the constitution as described above in the relation with the water-insoluble coloring material to be used. Other than such a constitution, the water-based ink of the present invention may adopt the same constitution as that of the conventional water-based ink. Each component comprising the ink of the present invention will be described below. First, the aqueous medium dispersing the water-insoluble coloring material will be explained.

<Aqueous Medium>

The water-based ink of the present invention comprises a mixed solvent of water and water-soluble organic solvents. The water-soluble organic solvents can be selected from the items listed below. In the present invention, when the water-soluble organic solvents are selected, it is first determined whether the solvent is a good solvent or a poor solvent to the water-insoluble coloring material to be used, and then, based on the determination results, the water-soluble organic solvents are selected such that at least both a good solvent and a poor solvent are contained and that the content of each water-soluble organic solvent is within the range defined in the present invention, and they are then appropriately blended, so as to prepare an ink.

Specific examples of such water-soluble organic solvents may include: alkyl alcohols containing 1 to 4 carbon atoms such as methyl alcohol, ethyl alcohol, n-propyl alcohol, isopropyl alcohol, n-butyl alcohol, sec-butyl alcohol or tert-butyl alcohol; amides such as dimethylformamide or dimethylacetamide; ketones or keto alcohols such as acetone or diacetone alcohol; ethers such as tetrahydrofuran or dioxane; polyalkylene glycols such as polyethylene glycol or polypropylene glycol; alkylene glycols whose alkylene group contains 2 to 6 carbon atoms, such as ethylene glycol, propylene glycol, butylene glycol, triethylene glycol, 1,2,6-hexanetriol, thiodiglycol, hexylene glycol or diethylene glycol; lower alkyl ether acetate such as polyethylene glycol monomethyl ether acetate; glycerin; lower alkyl ethers of polyalcohols, such as ethylene glycol monomethyl (or ethyl)ether, diethylene glycol methyl (or ethyl)ether, or triethylene glycol monomethyl (or ethyl)ether; N-methyl-2-pyrrolidone, 2-pyrrolidone, and 1,3-dimethyl-2-imidazolidinone. Moreover, deionized water is preferably used as water.

The content of the water-soluble organic solvents in the water-based ink of the present invention is not particularly limited. It is preferably within the range between 3% by mass and 50% by mass based on the total mass of the ink. The content of water in the ink is preferably within the range between 50% by mass and 95% by mass based on the total mass of the ink.

In a preferred embodiment of the present invention, the type and content of the water-soluble organic solvents constituting the water-based ink are adjusted such that when the total amount (% by mass) of a good solvent(s) in the ink is denoted by A and the total amount (% by mass) of a poor solvent(s) in the ink is denoted by B, the ratio of the ratio of A to B ranges from 10:5 to 10:30 both inclusive, preferably within the range between 10:5 or more and 10:10 or less, and more preferably within the range between 10:6 or more and 10:10 or less.

According to detailed studies of the present inventors, when the ratio of the good solvent(s) contained in the water-based ink is higher than the above range, it becomes difficult to obtain a high print density, although it is excellent in storage stability. In contrast, when the ratio of the good solvent(s) contained in the water-based ink is lower than the above range, sufficient storage stability might not be obtained, although a high print density can be obtained. Contrary to these cases, when the ratio of the good solvent(s) and the poor solvent(s) in the water-soluble organic solvents contained in the ink is adjusted as above, both the storage stability of the ink and a high print density can be obtained. In addition, in the present invention, as stated above, when the type of the water-soluble organic solvents contained in the ink is determined according to the Ka value determined by the Bristow method, which is an index indicating the permeability of each water-soluble organic solvent into a recording medium, a water-based ink can be obtained that has a sufficiently large area factor even with a small amount of ink droplet and can achieve a high print density. Such effects have not been achieved so far.

The storage stability of an ink generally means the stability of an ink in the state with no evaporation of water. The high print density is realized by the agglomeration phenomenon of the pigment, which occurs with the spread of the solvent on a paper during the ink dot formation when the ink landed on the paper.

Moreover, other than the above-described effects such as realization of both storage stability and high print density, the combined use of a good solvent and a poor solvent in the ink brings about an effect of preventing the agglomeration of the pigment to a certain extent when the water evaporates from the ink. More specifically, when ink droplets are attached onto the nozzle face of a recording head, the density of a coloring material in the ink is increased by evaporation of the ink. At this time, coexistence of the good solvent and the poor solvent in the ink can prevent the agglomeration of the pigment to a certain extent by the action of the good solvent. Thus, when a good solvent is contained in the ink, the agglomeration of the pigment on the nozzle face of a recording head is prevented, and thereby it can also be expected that reliability in the recovery operation of the recording head will be enhanced.

<Water-Insoluble Coloring Material>

A water-insoluble coloring material constituting the water-based ink of the present invention will now be explained. Regardless of its dispersion system, the water-insoluble coloring material constituting the water-based ink of the present invention may be a pigment dispersed with a resin dispersant or surfactant (a resin-dispersed pigment, surfactant-dispersed pigment), or a coloring material dispersible without using a dispersant etc. owing to the high dispersibility of the coloring material itself such as a microencapsulated pigment, a self-dispersing pigment having hydrophilic groups attached onto the surface of the pigment particles and a modified pigment in which polymeric organic groups are chemically bonded to the surface of pigment particles (polymer-binding self-dispersing pigment). Naturally, these pigments dispersed of different types may be used in combination. The content of the water-insoluble coloring material is 0.1% to 15% by mass, and more preferably 1% to 10% by mass based on the total mass of the ink. These pigments used in the present invention will be explained below.

[Pigment]

Pigments used for the water-based ink of the present invention are not particularly limited, and any of the following pigments can be used.

Carbon black is preferable as a pigment used for black ink. Examples of such carbon black may include furnace black, lamp black, acetylene black and channel black. More specifically, commercially available products mentioned below can be used: Raven 7000, Raven 5750, Raven 5250, Raven 5000 ULTRA, Raven 3500, Raven 2000, Raven 1500, Raven 1250, Raven 1200, Raven 1190 ULTRA-II, Raven 1170, and Raven 1255 (all of which are manufactured by Colombia Co., Ltd.), Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, Monarch 2000, and Valcan XC-72R (all of which are manufactured by Cabot Corp.), Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (all of which are manufactured by Degussa Corp.), No. 25, No. 33, No. 40, No. 47, No. 52, No. 900, No. 2300, MCF-88, MA600, MA7, MA8, and MA100 (all of which are manufactured by Mitsubishi Chemical Corp.). Further, carbon black, which has been newly produced for the present invention, can also be used. However, the present invention is not limited thereto, but any of the conventionally known carbon blacks can be used. Furthermore, such a black pigment is not limited to carbon black, but magnetic particles such as magnetite or ferrite, or titanium black may also be used as such a black pigment.

Specific examples of an organic pigment may include insoluble azo pigments such as Toluidine Red, Toluidine Maroon, Hansa Yellow, Benzidine Yellow or Pyrazolone Red, soluble azo pigments such as Lithol Red, Helio Bordeaux, Pigment Scarlet or Permanent Red 2B, derivatives from vat dyes such as alizarin, indanthrone or thioindigo maroon, phthalocyanine pigments such as phthalocyanine blue or phthalocyanine green, quinacridone pigments such as quinacridone red or quinacridone magenta, perylene pigments such as perylene red or perylene scarlet, isoindolinone pigments such as isoindolinone yellow or isoindolinone orange, imidazolone pigments such as benzimidazolone yellow, benzimidazolone orange or benzimidazolone red, pyranthrone pigments such as pyranthrone red or pyranthrone orange, indigo pigments, condensed azo pigments, thioindigo pigments, diketopyrrolopyrrole pigments, flavanthrone yellow, acylamide yellow, quinophthalone yellow, nickel azo yellow, copper azo methine yellow, perinone orange, anthrone orange, dianthraquinonyl red, and dioxazine violet. Naturally, organic pigments are not limited thereto, but other organic pigments may also be used.

Moreover, when organic pigments that can be used in the present invention are expressed by the color index (C. I.) number, examples of such C. I. numbers may include C. I. pigment yellow Nos. 12, 13, 14, 17, 20, 24, 74, 83, 86, 93, 97, 109, 110, 117, 120, 125, 128, 137, 138, 147, 148, 150, 151, 153, 154, 166, 168, 180 and 185, C. I. pigment orange Nos. 16, 36, 43, 51, 55, 59, 61 and 71, C. I. pigment red Nos. 9, 48, 49, 52, 53, 57, 97, 122, 123, 149, 168, 175, 176, 177, 180, 192, 215, 216, 217, 220, 223, 224, 226, 227, 228, 238, 240, 254, 255 and 272, C. I. pigment violet Nos. 19, 23, 29, 30, 37, 40 and 50, C. I. pigment blue Nos. 15, 15: 1, 15: 3, 15: 4, 15: 6, 22, 60 and 64, C. I. pigment green Nos. 7 and 36, and C. I. pigment brown Nos. 23, 25 and 26.

[Resin-Dispersed Pigment]

As stated above, a resin-dispersed pigment, i.e., a pigment dispersible by using a dispersant, can be used as a water-insoluble coloring material contained in the water-based ink of the present invention. In this case, a compound for dispersing the above-listed hydrophobic pigment is required. As such compounds, so-called dispersants including surfactants and resin dispersants or the like can be used. Such dispersants or surfactants are not particularly limited, but among others, anionic compounds or nonionic compounds can be preferably used. Examples of such an anionic compound may include a fatty acid salt, alkyl sulfate, alkylbenzene sulfonate, alkylnaphthalene sulfonate, dialkyl sulfosuccinate, alkyl phosphate, formalin condensates of naphthalenesulfonate, alkyl polyoxyethylene sulfate, and substituted derivatives thereof. Examples of such a nonionic compound may include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene alkylamine, glycerin fatty acid ester, an oxyethyleneoxypropylene block polymer, and substituted derivatives thereof. Examples of a resin dispersant may include a block copolymer, a random copolymer, a graft copolymer, and salts thereof, which consist of at least two monomers (at least one of them being a hydrophilic monomer) selected from the group consisting of styrene and derivatives thereof, vinylnaphthalene and derivatives thereof, fatty acid alcohol esters of $\alpha,\beta$-ethylene unsaturated carboxylic acid, acrylic acid and derivatives thereof, maleic acid and derivatives thereof, itaconic acid and derivatives thereof, fumaric acid and derivatives thereof, and vinyl acetate, vinyl alcohol, vinylpyrrolidone, acrylamide and their derivatives.

[Microencapsulated Pigment]

As stated above, a water-insoluble coloring material may be coated with an organic polymer for microencapsulation so as to obtain a microencapsulated pigment, which can be used as a water-insoluble coloring material for the water-based ink of the present invention. Examples of such a method of covering a water-insoluble coloring material with organic polymers for microencapsulation may include a chemical production method, a physical production method, a physicochemical production method, and a mechanical production method. Specific examples of such methods may include interfacial polymerization method, in-situ polymerization method, liquid-submerged hardening coating method, coacervation (phase separation) method, liquid-submerged drying method, melting dispersion cooling method, air suspension coating method, spray drying method, acid deposition method, and phase inversion emulsification method.

Examples of an organic polymer used as a material for a microcapsule may include polyamide, polyurethane, polyester, polyurea, epoxy resin, polycarbonate, urea resin, melamine resin, phenol resin, polysaccharide, gelatin, gum Arabic, dextran, casein, protein, natural rubber, carboxypolymethylene, polyvinyl alcohol, polyvinylpyrrolidone, polyvinyl acetate, polyvinyl chloride, polyvinylidene chloride, cellulose, ethyl cellulose, methyl cellulose, nitrocellulose, hydroxyethyl cellulose, cellulose acetate, polyethylene, polystyrene, a polymer or copolymer of (meth)acrylic acid, a polymer or copolymer of (meth)acrylic acid ester, a (meth)acrylic acid-(meth)acrylic acid ester copolymer, a styrene-(meth)acrylic acid copolymer, a styrene-maleic acid copolymer, soda alginate, fatty acid, paraffin, beeswax, Chinese wax, solid beef tallow, carnauba wax, and albumin.

Among these, organic polymers having an anionic group such as a carboxylic acid group or sulfonic acid group can be used. In addition, examples of a nonionic organic polymer may include polyvinyl alcohol, polyethylene glycol monomethacrylate, polypropylene glycol monomethacrylate, methoxy polyethylene glycol monomethacrylate, (co)polymers thereof, and cationic ring-opening polymers of 2-oxazoline. Of these, a completely ketonized product of polyvinyl alcohol is particularly preferable because it has low water solubility and is easy to dissolve in hot water but difficult to dissolve in cold water.

When the phase separation method or the acid deposition method is selected as a microencapsulation method, anionic organic polymers can be used as the organic polymer to form microcapsules. The phase separation method uses, as an organic solvent phase, a composite or complex consisting of an anionic organic polymer having an ability for self-dispersing or dissolving in water and a coloring material such as a self-dispersing organic pigment or carbon black, or a mixture consisting of a coloring material such as a self-dispersing organic pigment or carbon black, a hardening agent, and anionic organic polymer. The phase separation method involves adding water to the above organic solvent phase, or adding the above organic solvent phase into water, so as to conduct microencapsulation with self-dispersion (phase separation emulsification). In the above phase separation method, water-soluble organic solvents or additives to be used for the ink may be added into the organic solvent phase. Considering that a dispersion solution for the ink can be directly produced, it is particularly preferable to mix a liquid medium for the ink into the organic solvent phase.

On the other hand, in the acid deposition method, a hydrous cake is obtained by the steps of: neutralizing a part or all of the anionic groups of anionic group-containing organic polymer with a basic compound and kneading the polymer with a coloring material such as a self-dispersing organic pigment or carbon black in an aqueous medium; and adjusting the pH of the mixture to neutral or acidic with an acid compound so that the anionic group-containing organic polymer precipitates to stick to the pigment. The obtained hydrous cake is subjected to microencapsulation by neutralizing a part or all of the anionic groups with a basic compound. By this method, an anionic microencapsulated pigment, which is fine and containing a large amount of pigments, can be produced.

Examples of a solvent used in the above microencapsulation may include alkyl alcohols such as methanol, ethanol, propanol or butanol; aromatic hydrocarbons such as benzol, toluol or xylol; esters such as methyl acetate, ethyl acetate or butyl acetate; chlorinated hydrocarbons such as chloroform or ethylene dichloride; ketones such as acetone or methyl isobutyl ketone; ethers such as tetrahydrofuran or dioxane; and cellosolves such as methyl cellosolve or butyl cellosolve. Moreover, the microcapsules produced by the above-described method are subjected to centrifugal separation or filtration to separate it from the solvent, they are then mixed with water or necessary solvents, and the mixture is stirred and then dispersed again, so as to obtain a micro-encapsulated pigment of interest. The mean particle size of the microencapsulated pigment obtained by the above method is preferably between 50 nm and 180 nm.

[Self-Dispersing Pigment]

As stated above, as a water-insoluble coloring material contained in the water-based ink of the present invention, a self-dispersing pigment capable of dispersing without a dispersant can be used. As above self-dispersing pigment, there is a pigment in which hydrophilic groups are chemically bonded to the surface of pigment particles, either directly or via another group of atoms. For example, pigments in which a hydrophilic group introduced to the surface of a pigment particle is one selected from the group consisting of —COOM1, —SO$_3$M1, and —PO$_3$H(M1)$_2$ (wherein M1 represents any one selected from the group consisting of a hydrogen atom, an alkali metal, ammonium, and organic ammonium) can be preferably used. The above-mentioned another atom group may be one selected from the group consisting of an alkylene group containing 1 to 12 carbon atoms, a substituted or unsubstituted phenylene group, and a substituted or unsubstituted naphthylene group, can also be preferably used.

In addition, self-dispersing pigments obtained by the following surface oxidization methods can also be preferably used: a method of oxidizing carbon black with sodium hypochlorite; a method of oxidizing carbon black by ozonation in water; and a method comprising subjecting carbon black to ozonation and then subjecting it to wet oxidation with an oxidizing agent, so as to modify the surface of the carbon black.

[Polymer-Binding Self-Dispersing Pigment]

As stated above, as a water-insoluble coloring material contained in the water-based ink of the present invention, a polymer-binding type self-dispersing pigment capable of dispersing without using dispersants can be used. Such a polymer-binding self-dispersing pigment using no dispersant is preferably a reaction product between functional groups that are chemically bonded to the surface of the pigment, either directly or via another group of atoms, and a copolymer of an ionic monomer and a hydrophobic monomer. That is to say, when the polymer-binding type self-dispersing pigment having such a structure is used, the copolymerization ratio between the ionic monomer and the hydrophobic monomer, raw materials of the copolymer to modify the surface of the pigment, can be changed properly, thereby enabling proper control of the hydrophilicity of the modified pigment. Accordingly, the polymer-binding type self-dispersing pigment with the above structure is preferable. Moreover, the type of an ionic monomer and a hydrophobic monomer to be used can be selected as appropriate, or the combination thereof can be changed as appropriate, so that various properties can be added to the surface of the pigment. From this point also, the above polymer-binding type self-dispersing pigment is preferable.

(Functional Group)

A functional group contained in the above polymer-binding type self-dispersing pigment is chemically bonded to the surface of the pigment, directly or via another atom group. The functional group constitutes an organic group by a reaction with a copolymer described later. The type of the functional group is selected herein in association with the functional group of the copolymer. Taking into consideration the fact that the pigment is dispersed in an aqueous medium, the reaction between the functional group and the copolymer preferably generates a bond which is not hydrolyzed, such as a reaction causing an amide bond. An amino group is used as the functional group, and the copolymer has a carboxyl group, so that the copolymer can be introduced to the surface of a pigment particle via an amide bond. Otherwise, a carboxyl group is used as the functional group, and the copolymer supports an amino group, so that the copolymer can be introduced to the surface of a pigment particle via an amide bond.

Herein, the functional group that is chemically bonded to the surface of a pigment may be directly bonded thereto, or may be bonded thereto via another atom group. However, when a copolymer with a relatively high molecular weight is introduced to the surface of a pigment, in order to prevent steric hindrance among copolymers, it is preferable to introduce the functional group into the surface of a pigment via another atom group. Another atom group is not particularly limited herein as long as it is a multivalent element or organic group. From the viewpoint of adjusting the distance of the functional group from the surface of a pigment for the above-described reasons, for example, a divalent organic residue is preferably used. Examples of such a divalent organic residue may include an alkylene group and an arylene group (phenylene group).

More specifically, in Examples described later for instance, a pigment is reacted with aminophenyl(-sulfoethyl)sulfone, so as to introduce a phenyl(2-sulfoethyl)sulfone group into the surface of the pigment. Thereafter, an amino group of pentaethylenehexamine is reacted with the phenyl(2-sulfoethyl)sulfone group, so as to introduce an amino group as a functional group. In this case, the amino group is chemically bonded to the surface of a pigment via an atom group containing a phenyl(2-sulfoethyl) group.

(Copolymer of Polymer-Binding Type Self-Dispersing Pigment)

An anionic copolymer having anionic properties or a cationic copolymer having cationic properties is preferably used as the above-described copolymer consisting of an ionic monomer and a hydrophobic monomer.

Examples of the above anionic copolymer may include a copolymer consisting of a hydrophobic monomer and an anionic monomer, and salts thereof. Representative hydrophobic monomers used in the above copolymerization may include, but not limited to, methacrylic acid alkyl esters such as styrene, vinylnaphthalene or methyl methacrylate, acrylic acid alkyl esters such as phenyl methacrylate, benzyl methacrylate, 2-ethoxyethyl methacrylate, methacrylonitrile, 2-trimethylsiloxyethyl methacrylate, glycidyl methacrylate, p-tolyl methacrylate, sorbyl methacrylate or methyl acrylate, phenyl acrylate, benzyl acrylate, acrylonitrile, 2-trimethylsiloxyethyl acrylate, glycidyl acrylate, p-tolyl acrylate, and sorbyl acrylate.

Examples of an anionic monomer used in the above copolymerization may include but not limited to acrylic acid, methacrylic acid, and maleic acid.

In an embodiment of the copolymer used in the present invention, an anionic copolymer consisting of an anionic monomer and a hydrophobic monomer consists of at least two monomers, which consist of any one selected from the above listed hydrophobic monomers and at least one selected from the above listed anionic monomers. This copolymer includes a block copolymer, a random copolymer, a graft copolymer, and salts thereof.

The acid value of the anionic copolymer is preferably within the range between 100 and 500. Moreover, an anionic copolymer wherein the variation in the acid values is 20% or less of the mean acid value is preferably used. By setting the acid value of the copolymer within the above range, a problem that the hydrophilicity of the pigment surface is so high that water and solvents contained in the ink stay on the pigment surface after printing, thereby causing slow expression of the marker resistance of the ink after printing on a recording medium, can be effectively reduced. Moreover, another problem that excessively low hydrophilicity of the pigment surface prevents the pigment from being stably dispersed in the ink can also be effectively reduced.

Examples of the above salts may include alkali metal salts such as sodium, lithium or potassium, ammonium salts, alkylamine salts, and alkanolamine salts. These salts can be used as appropriate, singly or in combination of several types.

Next, in another embodiment of the copolymer used in the present invention, a cationic copolymer consisting of a cationic monomer and a hydrophobic monomer will be explained. Examples of such a cationic copolymer may include copolymers consisting of hydrophobic monomers and cationic monomers listed below, or salts thereof. As hydrophobic monomers, the above listed monomers can be used.

Examples of a cationic monomer used herein may include allylamine, dimethylaminoethyl methacrylate, diethylaminoethyl methacrylate, tertiary-butylaminoethyl methacrylate, dimethylaminoethyl acrylate, diethylaminoethyl acrylate, dimethylaminopropyl metacrylamide, N-vinylcarbazole, methacrylamide, acrylamide, and dimethylacrylamide.

Examples of a cationic copolymer may include a block copolymer, a random copolymer, and a graft copolymer, which consist of at least two monomers containing a hydrophobic monomer and a cationic monomer selected from the above monomers, and salts thereof. In particular, cationic copolymers having an amine value within the range between 100 and 500 are preferable. In addition, the variation in the amine values is preferably 20% or less of the mean amine value. The amine value is denoted by the mg number of KOH that is equivalent to hydrochloric acid necessary to neutralize 1 g of a sample. Examples of the above salts may include acetic acid, hydrochloric acid, and nitric acid. These salts can be used as appropriate, singly or in combination of several types.

The weight-average molecular weight (MW) of the above-described anionic or cationic copolymer is preferably within the range between 1,000 and 20,000, and more preferably within the range between 3,000 and 20,000. Moreover, those wherein the polydispersity Mw/Mn (weight-average molecular weight MW/number-average molecular weight Mn) of a cationic copolymer segment is 3 or less are preferably used. The content of such a cationic copolymer in the ink is preferably between 5% by mass and 40% by mass based on the total mass of the pigment particles whose surface is modified by the copolymer. With regard to polydispersity of the copolymer, when the polydispersity is large, it results in a wide molecular-weight distribution of the copolymer, and the aforementioned properties of the copolymer that are based on the molecular weight are hardly expressed. Accordingly, the molecular-weight distribution of the copolymer is preferably uniform.

Next, taking carbon black as an example, a method for modifying a pigment by chemically binding an organic group to the surface of a pigment particle will be explained. Methods are not particularly limited, and any commonly used method can be used herein, as long as the methods involve introducing functional groups on the surface of a pigment particle, binding a copolymer consisting of an ionic monomer and a hydrophobic monomer to these functional groups, so that the copolymer is chemically bonded to the surface of the pigment particle. For example, the following methods can be used.

A method comprising introducing polyethyleneimine or the like into the surface of a pigment particle such as carbon black and binding a copolymer consisting of an ionic monomer and a hydrophobic monomer and having an amino group to its terminal functional group by a diazonium reaction, or a method of binding a copolymer having an amino group and a carboxyl group in a molecule thereof to the surface of a pigment such as carbon black by a diazonium reaction, can be applied. Other than these methods, the most typical example is disclosed in WO 01/51566 A1.

In the above-described methods, where an anionic copolymer is chemically bonded to the surface of a carbon black particle for example, the following 3 steps are carried out:

the first step of attaching an aminophenyl(2-sulfoethyl) sulfone group (APSES) to the carbon black by a diazonium reaction;

the second step of attaching polyethyleneimine or pentaethylenehexamine (PEHA) to the above carbon black treated with APSES; and the third step of binding a copolymer consisting of a hydrophobic monomer and an ionic monomer having a carboxyl group to the particle surface.

In the above second step, the phenyl(2-sulfoethyl)sulfone group chemically bonded to the surface of the carbon black by the first step is reacted with an amino group of APSES, so that the amino group is introduced to the surface of the carbon black as a functional group that is chemically bonded thereto. In the third step, for example, a part of a carboxyl group contained in the ionic monomer portion of a copolymer is reacted with an amino group to form an amide linkage, so that the copolymer is introduced to the surface of the carbon black via an atom group containing a phenyl(2-sulfoethyl) group as a residue of APSES and a residue of PEHA.

In addition, in the above-described method, where a cationic copolymer is chemically bonded to the surface of a carbon black particle for example, the method comprises the following two steps:

the first step of attaching an aminophenyl(2-sulfoethyl) sulfone group (APSES) to the carbon black by a diazonium reaction; and the second step of binding a copolymer consisting of a hydrophobic monomer and a cationic monomer to the particle surface. By the above first step, a sulfone group is introduced to the surface of the carbon black as a functional group chemically bonded thereto. Thereafter, by the above second step, for example, a part of an amino group contained in the ionic monomer portion of a copolymer is reacted with a sulfone group (nucleophilic substitution), so that the copolymer is introduced to the surface of the carbon black via an atom group containing a phenyl(2-sulfoethyl) group as a residue of APSES.

[Water-Soluble Resin-Adsorbing Self-Dispersing Pigment]

As stated above, a resin-dispersed pigment, a microencapsulated pigment, a self-dispersing pigment, and a polymer-binding type self-dispersing pigment can be used as a water-insoluble coloring material contained in the water-based ink of the present invention. Other than these pigments, a pigment obtained by adding a water-soluble resin to a pigment can also be used. Such a water-soluble resin-containing pigment will be explained below.

In the present invention, water-soluble resin-adsorbing self-dispersing pigments obtained by adding a water-soluble resin to the above listed self-dispersing pigments can also be used.

Such water-soluble resin-adsorbing self-dispersing pigments can be produced by adding a water-soluble resin to the above-described self-dispersing pigment and stirring and blending the mixture. The preferable examples of a water-soluble resin-adsorbing self-dispersing pigment are described below.

A pigment wherein a hydrophilic group is chemically bonded to the surface of a pigment particle directly or via another atom group is an example of the self-dispersing pigments used for the water-soluble resin-attached self-dispersing pigments that can be used in the present invention. For example, pigments in which a hydrophilic group introduced to the surface of a pigment particle is one selected from the group consisting of —COOM1, —SO$_3$M1, and —PO$_3$H(M1)$_2$ (wherein M1 represents any one selected from the group consisting of a hydrogen atom, an alkali metal, ammonium, and organic ammonium) can be preferably used. The above another atom group, selected from the group consisting of an alkylene group containing 1 to 12 carbon atoms, a substituted or unsubstituted phenylene group, and a substituted or unsubstituted naphthylene group, can also be preferably used.

In addition, self-dispersing pigments obtained by the following surface oxidization methods can also be preferably used: a method of oxidizing carbon black with sodium hypochlorite; a method of oxidizing carbon black by ozonation in water; and a method comprising subjecting carbon black to ozonation and then subjecting it to wet oxidation with an oxidizing agent, so as to modify the surface of the carbon black. Alkali-soluble polymers are preferably adsorbed at a certain ratio to self-dispersing pigments used to produce a water-soluble resin-adsorbing self-dispersing pigment. If the surface of a self-dispersing pigment is modified to the maximum by the above-described carboxylation or the like, adsorption of alkali-soluble polymer to a pigment particle becomes substantially zero. In contrast, if the modification of the surface is too small, effects by the modification are hardly obtained. Accordingly, as an index of the degree of surface modification, the surface modification is carried out such that the content of carboxyl groups on the surface is set within the range between 0.1 and 0.5 mmol/g.

Examples of a water-soluble resin that can be used to produce a water-soluble resin-adsorbing self-dispersing pigment used in the present invention may include a copolymer consisting of a hydrophobic monomer and an anionic monomer, a copolymer consisting of a hydrophobic monomer, a nonionic monomer and an anionic monomer, and salts thereof. Examples of a representative hydrophobic monomer used herein may include, but not limited to, methacrylic acid alkyl esters such as styrene, vinylnaphthalene or methyl methacrylate, acrylic acid alkyl esters such as phenyl methacrylate, benzyl methacrylate, 2-ethoxyethyl methacrylate, methacrylonitrile, 2-trimethylsiloxyethyl methacrylate, glycidyl methacrylate, p-tolyl methacrylate, sorbyl methacrylate or methyl acrylate, phenyl acrylate, benzyl acrylate, acrylonitrile, 2-trimethylsiloxyethyl acrylate, glycidyl acrylate, p-tolyl acrylate, and sorbyl acrylate. Examples of a nonionic monomer may include but not limited to hydroxyethyl (meth)acrylate, polyethylene glycol (meth)acrylate, alkoxy polyethylene glycol (meth)acrylate, and silicon macromer. Examples of an anionic monomer used herein may include but not limited to acrylic acid, methacrylic acid, and maleic acid. The copolymer herein includes a block copolymer, a random copolymer, a graft copolymer, and salts thereof.

The acid value of the anionic copolymer used herein is preferably within the range between 100 and 500. Moreover, an anionic copolymer wherein the variation in the acid values is 20% or less of the mean acid value is preferably used. Examples of the above salts may include alkali metal salts such as sodium, lithium or potassium, ammonium salts, alkylamine salts, and alkanolamine salts. These salts can be used as appropriate, singly or in combination of several types. The weight-average molecular weight (MW) of the above-described anionic copolymer is preferably within the range between 1,000 and 20,000, and more preferably within the range between 3,000 and 20,000.

The term adsorption between a pigment and a water-soluble resin is used in the present invention to mean adsorption caused by van der Waals force or intermolecular force. As means for causing adsorption, ordinary stirring of a pigment and an alkali-soluble polymer is sufficient, but a dispersing device that applies high shearing when the pigment adsorbs the alkali-soluble polymer may be used. In order to determine the degree of adsorption of an alkali-soluble polymer to a self-dispersing pigment, evaluation using surface tension is appropriate. For example, surface tension is measured when a water-soluble resin is gradually added to 1% by mass of self-dispersing pigment (the amount of an alkali-soluble polymer vs. y in a system containing 1% by mass of self-dispersing pigment: plot A), and surface tension is measured with aqueous solutions of a water-soluble resin at various concentrations (the amount of a water-soluble resin vs. y: plot B). By comparing plot A with plot B to determine the difference in concentrations of water-soluble resin at which a certain surface tension is obtained, it is possible to estimate the approximate amount of a water-soluble resin adsorbed to the pigment.

<Other Components>

In order to maintain moisture, the water-based ink of the present invention may contain moisture retentive solids such as urea, urea derivatives, trimethylolpropane or trimethylolethane as ink components, other than the above-described components. In general, the content of moisture retentive solids such as urea, urea derivatives or trimethylolpropane in the ink is preferably within the range between 0.1% by mass and 20.0% by mass, and more preferably within the range between 3.0% by mass and 10.0% by mass based on the total mass of the ink.

In addition, other than the above components, the ink of the present invention may also comprise, as necessary, various additives such as a surfactant, pH adjuster, anticorrosive agent, antiseptic agent, fungicide, antioxidant, anti-reduction agent, evaporation-promoting agent or chelating agent.

Preferred examples of a surfactant used in the present invention may include compounds having any one of the following formulas (1) to (4):

Formulas (1)

(wherein R represents an alkyl group, and n represents an integer.)

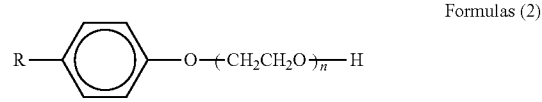

Formulas (2)

(wherein R represents an alkyl group, and n represents an integer.)

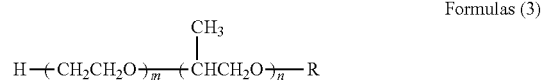

Formulas (3)

(wherein R represents a hydrogen atom or alkyl group, and each of m and n represents an integer.)

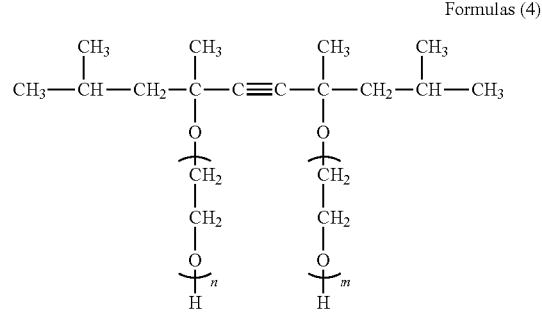

Formulas (4)

(wherein each of m and n represents an integer.)

<<Image Forming Method Using the Above Ink>>

The image forming method of the present invention is an ink jet recording method for recording on a plain paper using a black ink and at least one water-based color ink. The method is characterized in that water-based ink having the above-described structure is used as a black ink, and in that when an image is formed which consists of an image formed from the black ink adjacent to an image formed from the color ink, the image is formed by scanning for attaching the black ink, and then scanning for attaching the color ink to a region in which the image has been formed.

<Color Inks Used Together>

Now, color inks used together with the black ink in the present invention will be explained. In the image forming method of the present invention, any conventionally known water-based inks used in ink jet recording can be used. Coloring materials for color inks may include water-soluble dyes, and in particular, water-soluble dyes having an anionic group as a solubilizing group are preferable. The color of the color ink used in the present invention can be appropriately selected from the group consisting of cyan, magenta, yellow, red, green, blue and orange.

The water-soluble dyes having an anionic group used in the present invention are not particularly limited, as long as they are water-soluble acid dyes, direct dyes, or reactive dyes described in the color index. Moreover, although it is not a dye described in the color index, if the dye has an anionic group such as a sulfone group, it is available. These dyes are used within the range between 1% by mass and 10 by mass, and preferably within the range between 1% by mass and 5% by mass based on the total mass of the ink.

Specific examples of such a dye are as follows:

C. I. direct yellow: 8, 11, 12, 27, 28, 33, 39, 44, 50, 58, 85, 86, 87, 88, 98, 100, 110

C. I. direct red: 2, 4, 9, 11, 20, 23, 24, 31, 39, 46, 62, 75, 79, 80, 83, 89, 95, 197, 201, 218, 220, 224, 225, 226, 227, 228, 230

C. I. direct blue: 1, 15, 22, 25, 41, 76, 77, 80, 86, 90, 98, 106, 108, 120, 158, 163, 168, 199, C. I. acid yellow: 1, 3, 7, 11, 17, 23, 25, 29, 36, 38, 40, 42, 44, 76, 98, 99

C. I. acid red: 6, 8, 9, 13, 14, 18, 26, 27, 32, 35, 42, 51, 52, 80, 83, 87, 89, 92, 94, 106, 114, 115, 133, 134, 145, 158, 198, 249, 265, 289

C. I. acid blue: 1, 7, 9, 15, 22, 23, 25, 29, 40, 43, 59, 62, 74, 78, 80, 90, 100, 102, 104, 117, 127, 138, 158, 161

Other than the above listed dyes, the items 1 to 3 mentioned below can be also used as coloring materials for the color inks used in the present invention. These coloring materials are preferable because the majority of these coloring materials exhibit excellent water resistance when they are applied to a recording medium.

1. Dyes having a carboxyl group as a solubilizing group
2. Oil-soluble dyes
3. Pigments Oil-soluble dyes are not particularly limited, as long as they are described in the color index. Furthermore, it may be a novel dye that is not described in the color index, not particularly limited. Specific examples are described below. These dyes are used within the range between 1% by mass and 10% by mass, and more preferably within the range between 1% by mass and 5% by mass based on the total mass of the ink.

C. I. solvent blue: 33, 38, 42, 45, 53, 65, 67, 70, 104, 114, 115, 135

C. I. solvent red: 25, 31, 86, 92, 97, 118, 132, 160, 186, 187, 219

C. I. solvent yellow: 1, 49, 62, 74, 79, 82, 83, 89, 90, 120, 121, 151, 153, 154

When a pigment is used as a coloring material for the color ink used in the present invention, the pigment is used within the range between 1% by mass and 20% by mass, and more preferably within the range between 2% by mass and 12% by mass based on the total mass of the ink. Color organic pigments that can be used in the present invention are as follows.

Examples of a pigment used for a yellow ink may include C. I. Pigment Yellow 1, C. I. Pigment Yellow 2, C. I. Pigment Yellow 3, C. I. Pigment Yellow 13, C. I. Pigment Yellow 16, C. I. Pigment Yellow 74, C. I. Pigment Yellow 83, and C. I. Pigment Yellow 128.

Examples of a pigment used for a magenta ink may include C. I. Pigment Red 5, C. I. Pigment Red 7, C. I. Pigment Red 12, C. I. Pigment Red 48 (Ca), C. I. Pigment Red 48 (Mn), C. I. Pigment Red 57 (Ca), C. I. Pigment Red 112, and C. I. Pigment Red 122.

Examples of a pigment used for a cyan ink may include C. I. Pigment Blue 1, C. I. Pigment Blue 2, C. I. Pigment Blue 3, C. I. Pigment Blue 15:3, C. I. Pigment Blue 16, C. I. Pigment Blue 22, C. I. Vat Blue 4, and C. I. Vat Blue 6.

However, pigments used in the present invention are not limited thereto. Other than the above listed pigments, naturally, a pigment newly produced for the present invention can also be used.

Moreover, when a pigment is used, any type of dispersant for dispersing the pigment in the ink can be used together, as long as it is a water-soluble resin. A dispersant having a weight-average molecular weight within the range between 1,000 and 30,000 is preferable, and a dispersant having a weight-average molecular weight within the range between 3,000 and 15,000 is more preferable. Specific examples of such a dispersant may include a block copolymer, a random copolymer, a graft copolymer, and salts thereof, which consist of at least two monomers (at least one of them being a hydrophilic monomer) selected from the group consisting of styrene and derivatives thereof, vinylnaphthalene and derivatives thereof, fatty acid alcohol esters of α,β-ethylene unsaturated carboxylic acid, acrylic acid and derivatives thereof, maleic acid and derivatives thereof, itaconic acid and derivatives thereof, fumaric acid and derivatives thereof, and vinyl acetate, vinylpyrrolidone, acrylamide and their derivatives. Moreover, natural resins such as rosin, shellac or starch are also preferably used. These resins are soluble in an aqueous solution in which bases are dissolved, and they are alkali-soluble resins. Such a water-soluble resin used as a pigment dispersant is contained in the ink preferably within the range between 0.1% by mass and 5% by mass based on the total mass of the ink.

An aqueous medium preferably used for the color ink used in the present invention is water, or a mixed solvent of water and a water-soluble organic solvent. Such water is not general water containing various ions, but it is preferably ion-exchanged water (deionized water). Examples of a water-soluble organic solvent used by mixing with water may include: alkyl alcohols containing 1 to 4 carbon atoms such as methyl alcohol, ethyl alcohol, n-propyl alcohol, isopropyl alcohol, n-butyl alcohol, sec-butyl alcohol or tert-butyl alcohol; amides such as dimethylformamide or dimethylacetamide; ketones or keto alcohols such as acetone or diacetone alcohol; ethers such as tetrahydrofuran or dixane; polyalkylene glycols such as polyethylene glycol or polypropylene glycol; alkylene glycols whose alkylene group contains 2 to 6 carbon atoms, such as ethylene glycol, propylene glycol, butylene glycol, triethylene glycol, 1,2,6-hexanetriol, thiodiglycol, hexylene glycol or diethylene glycol; glycerin;

lower alkyl ethers of polyalcohols, such as ethylene glycol monomethyl (or ethyl)ether, diethylene glycol methyl (or ethyl)ether, or triethylene glycol monomethyl (or ethyl)ether; N-methyl-2-pyrrolidone, 2-pyrrolidone, and 1,3-dimethyl-2-imidazolidinone. Among these many water-soluble organic solvents, polyalcohols such as diethylene alcohol, and lower alkyl ethers of polyalcohols, such as triethylene glycol monomethyl (or ethyl)ether, are preferable.

The above-described water-soluble organic solvent is contained in the color ink generally within the range between 3% by mass and 50% by mass, and preferably within the range between 3% by mass and 40% by mass based on the total mass of the ink. Moreover, water used herein is contained in the ink within the range between 10% by mass and 90% by mass, and preferably within the range between 30% by mass and 80% by mass based on the total mass of the ink. Furthermore, in order that the color ink used in the present invention has desired physical property values as necessary, it may comprise, as appropriate, various additives such as a surfactant, anti-foaming agent or antiseptic agent, as well as the above components.

The black and color inks used in the present invention containing the above-described components preferably have good dischargeability from an ink jet recording head. Accordingly, from the viewpoint of dischargeability from an ink jet recording head, the above inks preferably have properties such as a viscosity of 1 to 15 mPa/s and a surface tension of 25 mN/m or more, and more preferably properties such as a viscosity of 1 to 5 mPa/s and a surface tension of 25 to 50 mN/m. In the case of the combined use of a black ink and a color ink, the surface tension of the color ink is preferably lower than that of the black ink. More specifically, the surface tension of the black ink is between 35 and 50 mN/m, and the surface tension of the color ink is between 25 and 35 mN/m.

<Image Forming Method>

The image forming method of the present invention will be explained with the following specific examples. The image forming method of the present invention is characterized in that it uses the water-based ink of the present invention having the above structure as a black ink, and in order to form an image in which an image formed with the black ink and an image formed with a color ink are adjacent, first scanning for attaching the black ink is carried out, and then scanning for attaching the color ink to the region in which the black image has already been formed. The specific means will be explained below.

Figure 8:
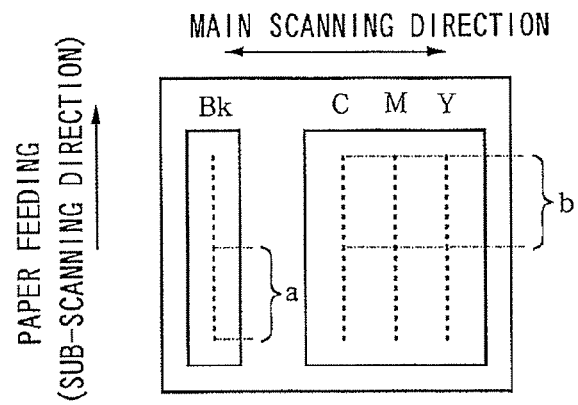
FIG. 8 is an example of a recording head used in the present invention.

FIG. 8 shows an example of a recording head that is used for the image forming method of the present invention. As shown in FIG. 8, the recording head has a line of discharge orifices for ejecting a black ink (Bk) and lines of discharge orifices for ejecting each of three color inks, cyan (C), magenta (M) and yellow (Y). When a color image is formed by the image forming method of the present invention, it is preferable to use a recording head in which the orifice line for ejecting the black ink and the orifice lines for ejecting the color inks do not overlap along the sub-scanning (paper-feed) direction. Accordingly, in order to form an image using the recording head shown in FIG. 8 for example, when only a black image is formed, the whole area of the black orifice line is used, and when a color image is formed with both black and color inks, it is preferable to use the portion a of the black orifice line shown in FIG. 8 and the portions b of the orifice lines for C, M and Y. The case of forming an image consisting of both black ink and color inks will be explained below in more detail, using FIG. 8.

In FIG. 8, first, using the portion a of the black ink discharge orifice line, the print head is scanned in the horizontal direction (main scanning direction), so that a black image is formed on a recording medium such as a plain paper by one-pass printing. Subsequently, the recording medium is moved in the vertical direction (sub-scanning direction) shown in FIG. 8 by the distance a. In the next step, using the portion b of each color ink orifice line, a color image is formed by one-pass printing in the forward scanning direction onto a region in which the black image has been formed using the orifices of portion a. At this time, the black ink discharge orifices in the portion a simultaneously form another black image onto the next region. Repeating this operation, an image consisting of both black ink and color inks is formed.

Figure 9:
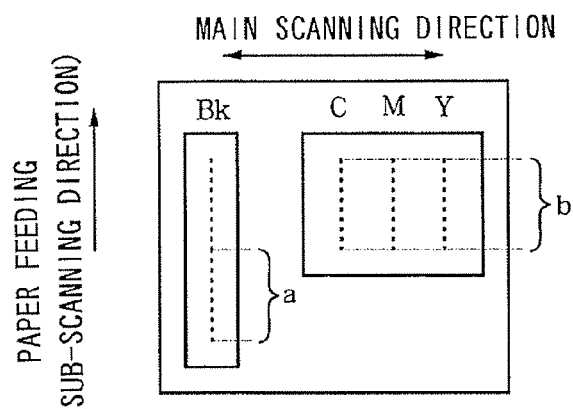
FIG. 9 is another example of a recording head used in the present invention.

FIG. 9 shows another example of a recording head that is used for the image forming method of the present invention. As in the case of FIG. 8, in FIG. 9 also, the black ink orifices in the portion a are used to form a black image, and the portion b corresponding to the whole area of each color ink discharge orifice line is used for C, M and Y, and thus, an image consisting of both black ink and color inks is formed in the same manner as described for FIG. 8.

Figure 10:
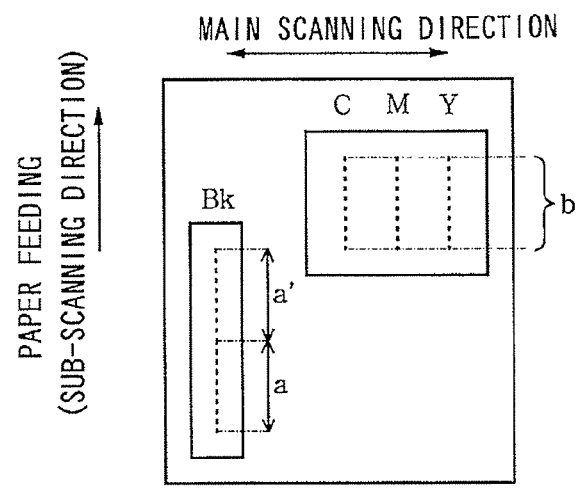
FIG. 10 is another example of a recording head used in the present invention.

FIG. 10 shows another example of a recording head that can be used in the image forming method of the present invention. As in the case of FIG. 8, in FIG. 10 also, the portion a of the black ink discharge orifices is used for black image formation, and the portion b corresponding to all orifices for each color ink of C, M and Y is used for color image formation, and thus, an image consisting of both black ink and color inks is formed. In the recording head shown in FIG. 10, the portion a of the black ink discharge orifice line and the portion b of the color ink discharge orifice lines are apart by a distance corresponding to the distance a' of single paper conveyance as shown in FIG. 10. Accordingly, the recording head with such a structure generates a time difference, which corresponds to a time necessary for a single reciprocating print scanning, from when a black image is formed until when a color image is formed. Accordingly, it can be said that the recording head shown in FIG. 10 has a structure more advantageous than that of the recording head shown in FIG. 9 in terms of bleeding between black ink and color inks.

Figure 11:
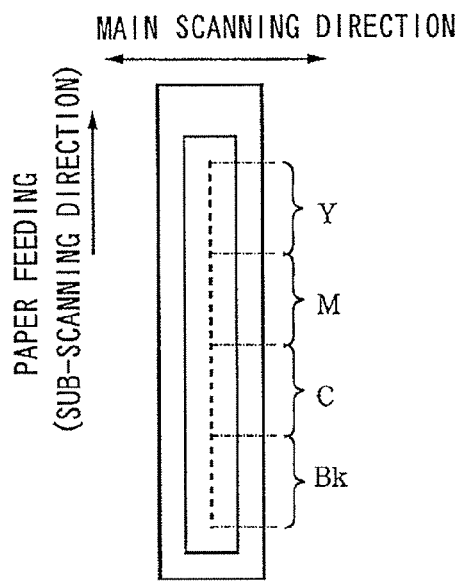
FIG. 11 is another example of a recording head used in the present invention.

FIG. 11 shows another example of a recording head that is used in the image forming method of the present invention. As shown in the figure, this recording head is configured such that discharge orifice lines for both black ink and color inks are aligned in a line in a paper feeding direction. In such a case also, a color image is formed after a black image is formed, corresponding to paper feeding.

Figure 12:
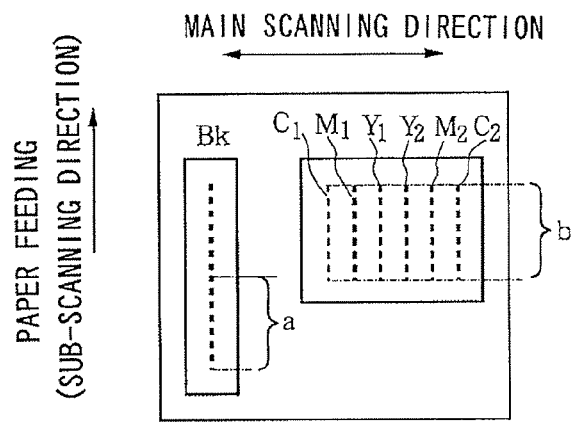
FIG. 12 is another example of a recording head used in the present invention.

FIG. 12 shows another example of a recording head that is used in the image forming method of the present invention. The recording head shown in FIG. 12 is configured such that for each color ink two discharge orifice lines are provided, i.e., cyan (C1, C2), magenta (M1, M2) and yellow (Y1, Y2), in a symmetric arrangement in the main scanning direction, so that the landing order of the color inks becomes the same both in the forward scanning and in the backward scanning. As a result, bidirectional printing becomes possible even when an image consisting of both the black ink and the color inks is formed. In this case, using the portion a of the black ink, a black image is first formed in the forward direction of the main scanning direction of the print head. Thereafter, a recording medium is carried by a distance a. Thereafter, using the portion b of color ink discharge orifice lines, the head forms a color image by one pass printing during the backward scanning in the main scanning direction on a region where the black image has been formed by the orifices in the portion a. At this time, the portion a of the black ink orifices forms another black image onto the next region. Repeating this operation, an image consisting of both black ink and color inks is formed.

Figure 13:
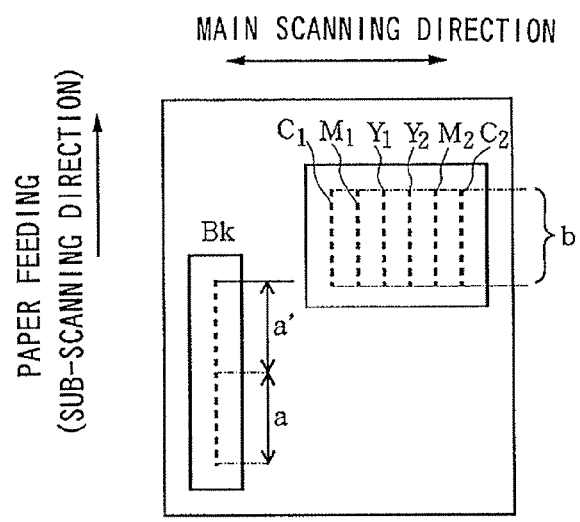
FIG. 13 is another example of a recording head used in the present invention.

The head for bidirectional printing shown in FIG. 12 may also be configured such that both the black nozzles and the color nozzles are arranged to provide an interval of single scanning between the black image formation and the color image formation as described above, so as to be more advantageous in anti-bleeding effect (refer to FIG. 13). The image forming method of the present invention is described above, but the form of a recording head used for the method of the present invention is not limited to those shown in FIGS. 8 to 13.

[Recording Method, Recording Unit, Cartridge, and Recording Apparatus]

Figure 2:
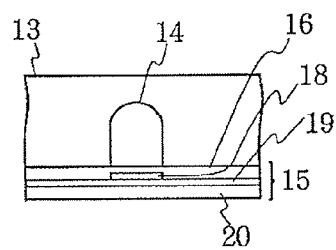
FIG. 2 is a cross-sectional view of the ink jet recording apparatus head.

Next, an example of an ink jet recording apparatus preferably used in the present invention will be described. First, an example of the structure of a head that is a principal part of an ink jet recording apparatus using thermal energy is shown in FIGS. 1 and 2. FIG. 1 is a sectional view of a head 13 shown along the ink channel, and FIG. 2 is a sectional view along the A-B line of FIG. 1. The head 13 is formed by attaching glass, ceramic, silicon, or plastic etc. in which at least one ink flow path 14 is provided, to a heat generating element 15 (not limited to what is shown in Figures). The heat-generating element 15 is composed of a protective film 16 made of silicon oxide, silicone nitride, silicon carbide or the like, aluminum electrodes 17-1 and 17-2 made of aluminum, aurum, aluminum-copper alloy or the like, a heat-generating resistance layer 18 made of $HfB_2$, TaN, TaAl etc., a heat-accumulating layer 19 made of thermal oxidized silicon, oxidized aluminum etc., and a substrate 20 made of silicon, aluminum, aluminum nitride etc. which is excellent in heat releasing.

Figure 3:
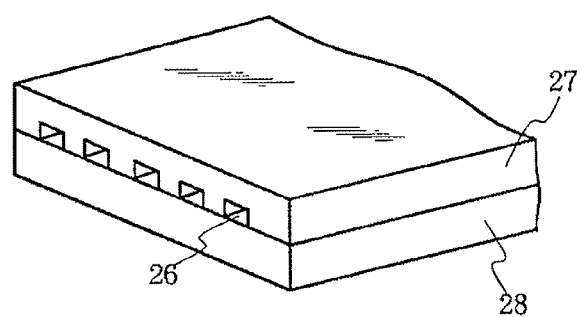
FIG. 3 is a perspective view of the appearance of a head constituted of several heads as shown in FIG. 1.

Upon application of the electric signal to the electrodes 17-1 and 17-2 as a pulse, heat is rapidly generated at the region shown by "n" to form a bubble in the ink 21 in contact with this region. The meniscus 23 of the ink is ejected by the pressure of the bubble thus produced, and is ejected from the orifice 22 to a recording medium (for example, paper) 25 in the form of an ink droplet 24 to attach onto the recording medium 25. FIG. 3 schematically illustrates a recording head having an array of nozzles similar to that is shown in FIG. 1. This head is prepared by bonding a glass plate 27 having a number of flow path 26 to a heat generating head 28 similar to that is shown in FIG. 1.

Figure 4:
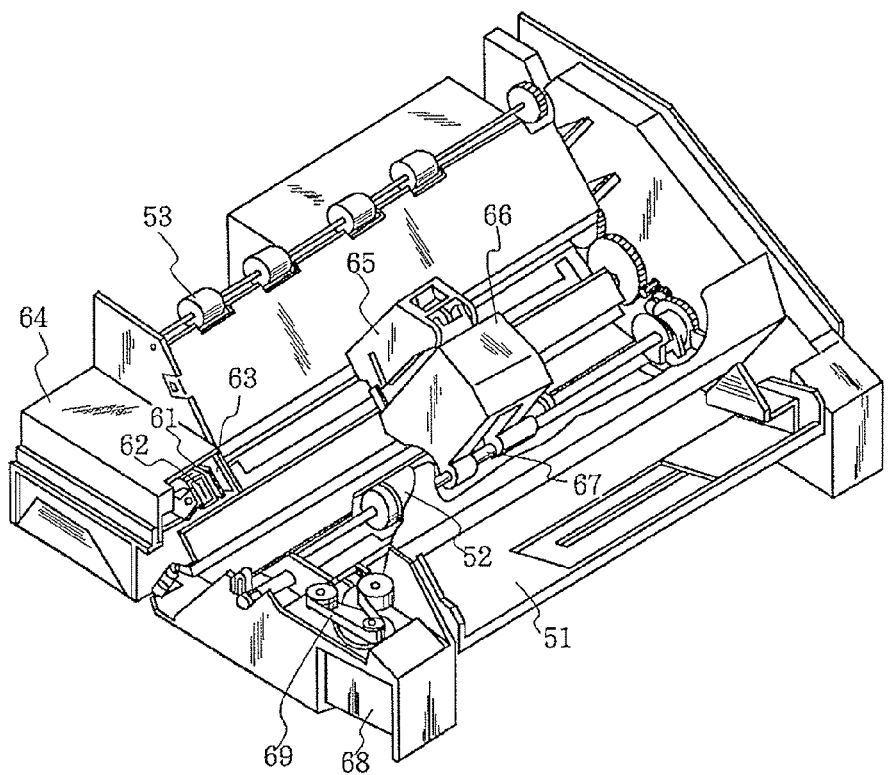
FIG. 4 is a perspective view showing an example of an ink jet recording apparatus.

FIG. 4 illustrates an example of an ink-jet recording apparatus in which such a head as described above is incorporated. In FIG. 4, the blade 61 is a wiping member, one end of which is a fixed end held by a blade-holding member to cantilever. The blade 61 is provided at a position adjacent to a region in which a recording head 65 operates, and in this aspect, is held in such a form that it protrudes into the path of the recording head 65. Reference numeral 62 designates a cap for an ejection opening of the recording head 65, and the cap is arranged in a home position adjacent to the blade 61, moves in the direction perpendicular to the moving direction of the recording head 65, and caps the ink-ejecting opening when touching it. Numeral 63 designates an ink-absorber provided adjacent to the blade 61, which is held in the moving path of the recording head 65 in a projecting form like the blade 61. The above blade 61, cap 62 and ink-absorber 63 constitute an ejection recovery part 64, and the blade 61 and the ink-absorber 63 serve to remove moisture and dust on the ink-ejecting opening.

Reference numeral 65 designates a recording head. The head contains an energy generating means for ink ejection and performs recording by ejecting ink towards a recording medium opposite to the ink-ejecting opening. Numeral 66 designates a carriage for carrying the recording head 65 to move it. The carriage 66 is engaged with a guide shaft 67 in a slidable manner, and a part of the carriage 66 is connected to a belt 69 (not shown in the figure) driven by a motor 68. Thus the carriage 66 can move along the guide shaft 67, and the recording head 65 can move in the recording region and the region adjacent thereto.

Reference numeral 51 designates a recording medium feeding part for inserting a recording medium and numeral 52 designates a paper-delivery roller driven by a motor not shown in the figure. With such an arrangement, the recording medium is fed to the position opposite to the ink ejecting opening of the recording head 65 and conveyed to a paper output portion provided with a paper output roller 53 as recording proceeds. In the image recording apparatus according to this aspect of the invention, the recording head is moved forward and backward along a direction perpendicular to the recording medium-carrying direction, and in the both forward and backward ways, the head can apply at least one of black ink and color ink to the recording medium. Recording data processing may be done utilizing conventional technology relating to the both-way printing.

In the above arrangement, while the recording head returns to its home position after recording, the cap 62 of the ejection recovery part 64 recedes from the moving path of the recording head, but the blade 61 is projecting in the moving path. As a result, the ink discharge opening of the recording head 65 is wiped. As a result, the discharge orifice face of the recording head 65 is wiped also during this movement. The above movement of the recording head 65 to its home position is made not only when the recording is completed or for ejection recovery, but also when the recording head 65 is moving in the recording region for recording, that is, it moves to the home position adjacent to the recording region at given intervals during recording, so as to wipe the ejection opening face with this movement.

Figure 5:
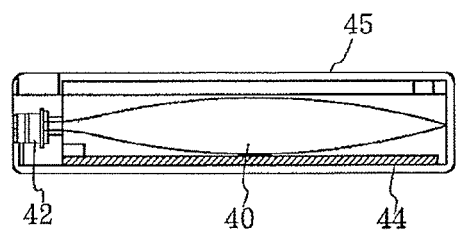
FIG. 5 is a longitudinal sectional view of an ink cartridge.

FIG. 5 shows one example of an ink cartridge for storing ink for feeding ink to the recording head through an ink feeding member such as a tube. In the drawing, reference numeral 40 denotes a member constituting the ink cartridge 45, an ink storage portion such as an ink bag, whose tip is equipped with a rubber stopper 42. The ink in the ink bag 40 can be fed to the recording head by inserting a needle (not shown in the figure) into the stopper 42. Numeral 44 designate an ink absorber for receiving waste ink. For the ink storage portion, its surface in contact with ink is preferably made of polyolefin, particularly polyethylene.

Figure 6:
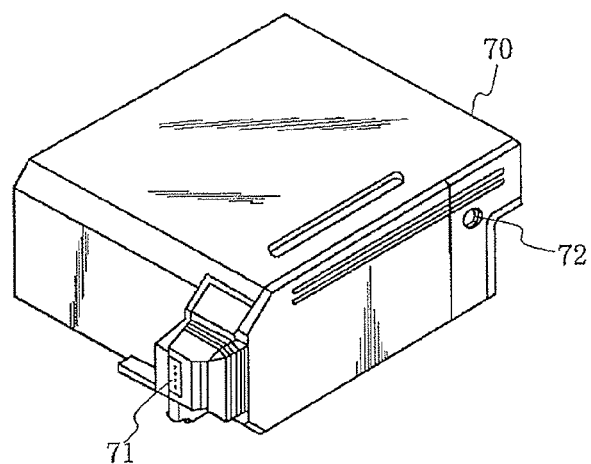
FIG. 6 is a perspective view showing an example of a recording unit.

The ink-jet recording apparatus used in the present invention are not limited to the apparatus as described above in which the head and the ink cartridge are separately provided. Therefore, a device in which these members are integrally formed as shown in FIG. 6 can also be preferably used. In FIG. 6, reference numeral 70 designates a recording unit including an ink storing portion containing an ink, for example, an ink-absorbing member in it. The ink contained in the ink-absorbing member is ejected as an ink droplet from a head 71 having a plurality of orifices. As a material for the ink-absorbing member, polyurethane may be preferably used. Reference numeral 72 indicates an air passage for communicating the interior of the recording unit 70 with the atmosphere. This recording unit 70 can be used in place of the recording head 65 shown in FIG. 4, and detachably installed on the carriage 66.

A configuration example of the recording head utilizing mechanical energy is an on-demand ink jet recording head comprising: a nozzle-forming substrate having a plurality of nozzles, a pressure-generating element consisting of a piezoelectric material and an electric conductive material opposed to the nozzles and an ink filling in the peripheral portion of the pressure-generating element, in which the pressure-generating element is displaced by applying voltage, so as to eject ink droplets from the nozzle.

Figure 7:
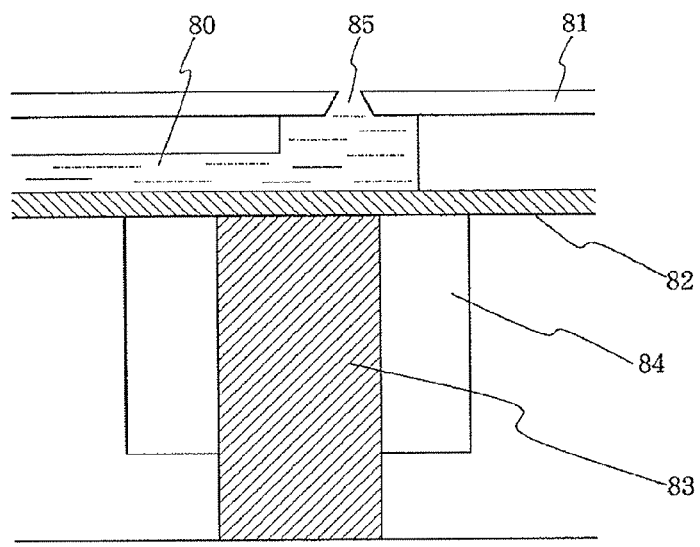
FIG. 7 is a view showing an example of the structure of a recording head.

In FIG. 7, the ink flow path 80 is made from a photosensitive resin; the orifice plate 81 which is made of a metal such as stainless steel and nickel; the ejection orifice 85 which is formed by making a hole in the orifice plate 81 by electrocasting or press processing; the vibration plate 82 which is made from a metal film such as stainless steel, nickel and titanium and a highly elastic resin film; and the piezoelectric element 83 which is made from a dielectric material such as barium titanate and PZT. The recording head of the above constitution works as follows: when a pulse-like voltage is given to the piezoelectric element 83, a strain stress is generated, of which energy deforms the vibration plate connected with the piezoelectric element 83 to apply pressure vertically to the ink in the ink flow path 80, and an ink droplet (not shown) is discharged from the orifice 85 of the orifice plate 81 to perform recording. Such a recording head is incorporated into the recording apparatus similar to the one shown in FIG. 4. Detailed action of the parts of the recording apparatus may be the same as mentioned above. FIG. 7 shows an example of the structure of the recording head that is the principal part of the recording apparatus.

The head is comprised of an ink channel 80 connecting to an ink chamber (not shown in the figure), an orifice plate 81 for ejecting a desired volume of ink droplets, a diaphragm 82 for directly applying pressure to the ink, a piezoelectric element 83 that is connected to the diaphragm 82 and is displaced by an electronic signal, and a substrate 84 for supporting and fixing the orifice plate 81, the diaphragm 82 or the like.

In FIG. 7, the ink channel 80 is made of a photosensitive resin or the like, and a discharge port 85 is formed through the orifice plate 81 made of metal such as stainless or nickel, by drilling or the like, such as electroforming or press work. The diaphragm 82 is made of a metal film such as stainless, nickel or titanium and a highly elastic resin film. The piezoelectric element 83 is made of a dielectric material such as barium titanate or PZT. The recording head with the above structure gives a pulsed voltage to the piezoelectric element 83 to allow it to generate distortion stress. Then, the generated energy deforms the diaphragm connected to the piezoelectric element 83, thereby vertically pressurizing the ink contained in the ink channel 80, so that ink droplets (not shown in the figure) are ejected from the discharge orifice 85 on the orifice plate 81, so as to perform printing. This recording head is incorporated into an ink jet recording apparatus similar to that shown in FIG. 4, and used. The detailed actions of the ink jet recording apparatus are the same as described above.

EXAMPLES

The present invention will be described more specifically with reference to the following examples and comparative examples. However, the present invention is not limited by the following examples, as long as it is in the scope of the invention. It is to be noted that "part" and "%" are based on mass criteria in the present specification, unless otherwise specified.

(Preparation of Pigment Dispersion Solution 1)

Ten parts of carbon black having a specific surface area of 210 $m^2/g$ and a DBP oil absorption of 74 ml/100 g, 20 parts of a 10% styrene-acrylic acid copolymer (acid value: 200, weight-average molecular weight: 10,000) in water neutralized with sodium hydroxide, and 70 parts of ion exchanged water were mixed. The mixture was dispersed for 1 hour using a sand grinder. Thereafter, coarse particles were removed by centrifugal separation, and the supernatant was subjected to pressure filtration using a microfilter with a pore size of 3.0 µm (manufactured by Fuji Photo Film Co., Ltd.) to obtain a pigment dispersion solution 1 dispersed with a resin. The obtained pigment dispersion solution 1 had a solid content of 10%, a pH of 10.0 and an average particle size of 120 nm.

(Preparation of Pigment Dispersion Solution 2)

Carbon black (10 g) having a specific surface area of 230 $m^2/g$ and a DBP oil absorption of 70 ml/100 g, 3.41 g of p-amino-N-benzoic acid, and 72 g of water were fully mixed, to which 1.62 g of nitric acid was added dropwise and stirred at 70° C. Minutes later, a solution of 1.07 g sodium nitrite in 5 g of water was added to the mixture, followed by further stirring for 1 hour. The obtained slurry was filtrated with Toyo filter No. 2 (manufactured by Advantis), and pigment particles were fully washed with water and then dried at 90° C. in an oven. Thereafter, water was added to this pigment to prepare a pigment aqueous solution of 10% pigment concentration. The thus obtained pigment dispersion solution 2 contained anionically charged self-dispersing carbon black having a hydrophilic group bonded to the surfaces of the pigment particles via a phenyl group.

The density of ionic groups of the thus prepared self-dispersing carbon black measured by the following method was 1.3 µmol/$m^2$. The concentration of sodium ions was measured using an ion meter (manufactured by DKK), and the obtained value was converted into the density of ionic groups. By the above-described method, a pigment dispersion solution 2 was obtained, in which self-dispersing carbon was obtained by introducing a —$C_6H_4$—COONa group into the surface of carbon black.

(Preparation of Pigment Dispersion Solution 3)

Carbon black (500 g) having a specific surface area of 220 $m^2/g$ and a DBP oil absorption of 112 ml/100 g, 45 g of aminophenyl(2-sulfoethyl)sulfone (APSES), and 900 g of distilled water were placed in a reactor, and while keeping the temperature at 55° C., the mixture was stirred at 300 RPM for 20 minutes. Thereafter, 40 g of 25% sodium nitrite was added dropwise to the mixture for 15 minutes, and then 50 g of distilled water was added thereto. Thereafter, keeping the temperature at 60° C., a reaction was carried out for 2 hours. Thereafter, the reaction product was taken out while diluting with distilled water to a solid content of 15%. Thereafter, centrifugal separation and a purification treatment to remove impurities were carried out. In the thus prepared dispersion solution, the functional group of the above APSES was bonded to the carbon black. This dispersion solution was called A1.

Subsequently, in order to determine the mole number of the functional group bonded to the carbon black in the dispersion solution A1, Na ions in the dispersion solution were measured with a probe-type sodium electrode. The obtained value was converted per carbon black particle, so as to obtain the mole number of the functional group bonded to the carbon black. Thereafter, the previously prepared dispersion solution A1 with a solid content of 15% was added dropwise into a pentaethylenehexamine (PEHA) solution. During this process, the PEHA solution was intensively stirred while keeping at room temperature, and the dispersion solution A1 was added dropwise thereto over 1 hour. During this process, the concentration of PEHA was set to 1 to 10 times of the previously determined mole number of Na ions, and the amount of the PEHA solution was set to be equivalent to the amount of the dispersion solution A1. Thereafter, the obtained mixture was stirred for 18 to 48 hours, and then a purification treatment was carried out to eliminate impurities. Finally, a dispersion of carbon black to which pentaethylenehexamine (PEHA) was obtained at a solid content of 10%. This dispersion solution was called B1.

Subsequently, a copolymer styrene-acrylic acid resin solution was prepared by weighing 190 g of styrene-acrylic acid resin having a weight-average molecular weight of 8,000, an acid value of 140, and a polydispersity Mw/Mn (weight-average molecular weight Mw/number-average molecular weight Mn) of 1.5, to which 1,800 g of distilled water and NaOH necessary to neutralize the resin were added and stirred. Thereafter, while stirring, 500 g of the previously prepared dispersion solution B1 of a solid content of 10% was added dropwise to the above styrene-acrylic acid resin aqueous solution. Thereafter, the mixture of B1 and the styrene-acrylic acid resin aqueous solution was transferred to an evaporating dish of Pyrex (trademark), and it was then heated at 150° C. for 15 hours for evaporation. The dried matter obtained after the evaporation was cooled to room temperature.

Subsequently, using a dispersing device, the dried matter obtained after the evaporation was dispersed in distilled water adjusted to pH 9.0 with NaOH. While further stirring, 1.0 M NaOH was added to the solution to adjust the pH of the solution to 10-11. Pigment dispersion solution 3 was obtained after the desalting and purification of the above solution and removal of coarse particles. The pigment dispersion solution 3 had a solid content of 10%, a pH of 10.1 and an average particle size of 130 nm. The following is a scheme of synthesizing a polymer-binding self-dispersing pigment in which an organic group is chemically bonded to the surface of a carbon black particle contained in the above pigment dispersion solution 3.

Scheme of Synthesizing Modified Pigment

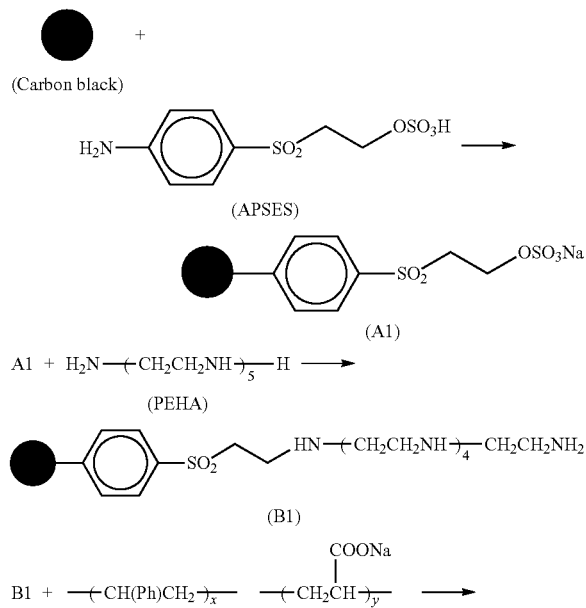

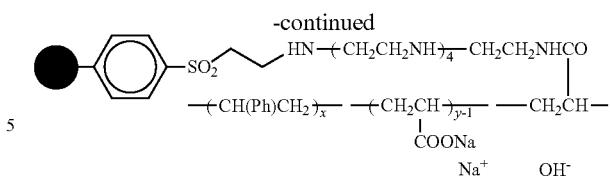

[Method of Determining Whether the Used Water-Soluble Organic Solvent is Good Solvent or Poor Solvent]

In order to determine whether the used water-soluble organic solvent is a good solvent or poor solvent to a pigment, or a pigment and a dispersant contained, in the above pigment dispersion solution, the following experiment was carried out. First, with each of the above pigment dispersion solutions 1 to 3 of 10% solid content, a test dispersion solution for determining good or poor solvent was prepared at the following formulation.

(Mixing Ratio for Dispersion Solution for Determining Good or Poor Solvent)

Each pigment dispersion solution of 10% solid content: 50 parts

Each water-soluble organic solvent described in Table 1: 50 parts (Determination)

10 g of the above-prepared test solution for determining good or poor organic solvent was placed in a sample jar equipped with a transparent glass lid. After the jar was covered with the glass lid, the solution was stirred well, and left standing in an oven at 60° C. for 48 hours. Thereafter, the dispersion solution was taken out of the oven to be used as a measurement sample. The particle size of the water-insoluble coloring material contained in the solution was measured using a rich solution particle size analyzer (Product name: FPAR-1000; manufactured by Otsuka Electronics). The obtained value denoted the particle size of an undiluted solution (the particle size measured without diluting the solution) of the dispersion solution used to determine whether the organic solvent is a good solvent or poor solvent after storage at 60° C. for 48 hours. Separately, reference pigment dispersions were prepared in the same manner as the preparation of the test dispersion solutions except that the water-soluble organic solvent was replaced with the same amount of water. The particle size of the water-insoluble coloring material in the undiluted reference solution was measured by using the rich solution particle size analyzer but without heating-storage of the solution. The obtained particle size of the undiluted test solution was compared with that of the reference dispersion solution. When the former particle size was larger than the latter, the contained solvent was determined to be a poor solvent. In contrast, when the former particle size was equal to or smaller than the latter, it was determined to be a good solvent.

[Method of Measuring Ka Value of Each Water-Soluble Organic Solvent]

First, in order to facilitate the measurement of the Ka value of each water-soluble organic solvent, a 0.5% dye solution in water of the following composition was prepared.

| | |
|---|---|
| Water-soluble dye C. I. direct blue 199 | 0.5 parts |
| Pure water | 99.5 parts |

Subsequently, using the above 0.5% dye solution, colored aqueous solutions respectively containing the water-soluble organic solvents to be measured at 20% were prepared with the following formulation:

| | |
|---|---|
| The above 0.5% dye aqueous solution | 80 parts |
| Each water-soluble organic solvent described in Table 1 | 20 parts. |

Using the above-prepared colored aqueous solution containing 20% of water-soluble organic solvent, the Ka value was determined by the Bristow method, by using Dynamic Permeability Tester S (product name) manufactured by Toyo Seiki Seisaku-sho, Ltd.

<<Determination and Determination Results>>

Table 1 shows the results obtained by determining whether or not each of the above measured water-soluble organic solvents usable for the ink is a good solvent or poor solvent to each of the pigment dispersion solutions 1 to 3, and the measurement results of the Ka value of each 20% water-soluble organic solvent-containing aqueous solution. In Table 1, the polyethylene glycol derivative denotes a derivative of the following structure, having a molecular weight of approximately 1,000:

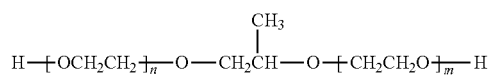

wherein each of n and m represents a number between 5 and 20.

TABLE 1

Determination results whether or not each water-soluble organic solvent is good solvent or poor solvent, and Ka values

| Water-soluble organic solvent | Water-insoluble coloring material | | | Ka value of 20% aqueous solution |
|---|---|---|---|---|
| | Pigment dispersion 1 | Pigment dispersion 2 | Pigment dispersion 3 | |
| Glycerin | ○ | ○ | ○ | 0.13 |
| Ethylene glycol | ○ | ○ | ○ | 0.09 |
| Diethylene glycol | X | X | X | 0.14 |
| Trimethylol propane | ○ | ○ | ○ | 0.19 |
| Polyethylene glycol 600 | X | X | X | 0.17 |
| Polyethylene glycol derivative | X | X | X | 0.18 |
| 2-pyrrolidone | X | ○ | X | 0.19 |

In the table, ○: good solvent, X: poor solvent

Examples 1 to 5

The above-described water-soluble organic solvents, pigment dispersion solutions 1 to 3, and components described in Table 2 were mixed and fully stirred for dissolution or dispersion. Thereafter, the obtained mixture was subjected to pressure filtration using a microfilter with a pore size of 3.0 μm (manufactured by Fuji Photo Film Co., Ltd.), so as to prepare inks of Examples 1 to 5. The inks were prepared such that when the total amount (% by mass) of the good solvent in the ink was represented by A and the total amount (% by mass) of the poor solvent in the ink was represented by B, the ratio of A to B was within the range between 10:5 or more and 10:30 or less, and when Ka values of the plurality of water-soluble organic solvents were determined by the Bristow method and the obtained values were compared with each other, a water-soluble organic solvent having the largest Ka value was a poor solvent.

TABLE 2

Composition of inks of Examples 1 to 5

| | | | Composition (% by mass) | | | | |
|---|---|---|---|---|---|---|---|
| | | | Ex. 1 | Ex. 2 | Ex. 3 | Ex. 4 | Ex. 5 |
| Water-insoluble coloring material | | Pigment dispersion 1 | 50 | — | — | — | — |
| | | Pigment dispersion 2 | — | 50 | — | 50 | — |
| | | Pigment dispersion 3 | — | — | 50 | — | 50 |
| Water-soluble organic solvent | Good solvent | Glycerin | 5 | 5 | 5 | 7 | 5 |
| | | Ethylene glycol | 5 | — | — | — | — |
| | | Trimethylol propane | — | — | — | — | — |
| | Poor solvent | Diethylene glycol | — | — | 5 | 3 | 3 |
| | | Polyethylene glycol 600 | 10 | 15 | 10 | 6 | — |
| | | Polyethylene glycol derivative | — | — | — | — | 10 |
| Surfactant | | Acetylene glycol EO adduct (*) | 0.1 | 0.1 | 0.1 | 0.1 | 0.1 |
| | | Pure water | 29.9 | 29.9 | 29.9 | 33.9 | 31.9 |

(*) Product name: Acetylenol EH manufactured by Kawaken Fine Chemicals Co., Ltd.

<Verification of Ink of Example 4>

Assuming that the composition of the above-prepared ink of Example 4 was unknown, whether or not the ink was the object of the present invention was verified by the following method. By this verification method, even if the composition of the ink is unknown, it can be easily confirmed whether or not the ink is the object of the present invention.

The type and amount of organic solvents contained in the ink can be identified using, for example, GC/MS (product name: TRACE DSQ, manufactured by ThermoQuest). More specifically, for example, a sample obtained by diluting 1 g of the ink of Example 4 with methanol was analyzed using the above GC/MS. As a result, first of all, the existence of glycerin, diethylene glycol and polyethylene glycol 600 was confirmed in the sample. Then, it was necessary to determine whether these three types of solvents were good solvents or poor solvents. In the above-described method of determining whether a solvent is a good solvent or poor solvent, a dispersion solution in which a water-insoluble coloring material was dispersed to the solvent and water was prepared. However, in order to prepare such a dispersion solution from the ink, it is necessary to extract a water-insoluble coloring material or dispersant from the ink. However, in this case, the water-insoluble coloring material or dispersant might be deteriorated during the extraction process.

Thus, the present inventors have made various studies to find a method, which involves the direct use of the ink of Example 4 to determine whether the solvent contained therein is a good solvent or poor solvent and provides determination results that are consistent with the results of the above-described determination method. As a result, the present inventors have found that the following verification method is preferable. First, the following three types of ink dilutions were prepared by adding each of the above three types of water-soluble organic solvents to be determined in an equal amount to 100 parts of the ink of Example 4, and determination was carried out using these solutions. That is to say, 3 types of ink dilutions of compositions shown in Table 3 (shown as Verification examples 1 to 3 in Table 3) were prepared, each of which contained approximately 50% by mass of water-soluble organic solvent as a determination target. Thereafter, these solutions were kept standing at 60° C. for 48 hours, and the particle sizes of water-insoluble coloring materials contained therein were then measured using a rich solution particle size analyzer (Product name: FPAR-1000; manufactured by Otsuka Electronics Co., Ltd.). On the other hand, the ink that was not subjected to the storage under heating was also measured in terms of the particle size of the water-insoluble coloring material contained therein. Determination of a good solvent or poor solvent was carried out in accordance with the criteria that the measurement value of the particle size after the storage under heating is compared with each other with that of the ink without storage, and that when the former particle size is greater than the latter particle size, it is determined to be a poor solvent, and when the former particle size is equal to or smaller than the latter particle size, it is determined to be a good solvent. In Table 3 shown below, the viscosity (cP) of the used solvents is also shown as a measurement condition for the particle size in an undiluted solution. The viscosity was measured with a type E viscometer (VISCONIC type ED, manufactured by Tokyo Keiki Co., Ltd.)

TABLE 3

Composition of test samples for determining good solvent or poor solvent regarding solvents used for ink of Example 4

| | Ink of Example 4 | Composition of test Examples [parts] | | |
|---|---|---|---|---|
| | | 1 | 2 | 3 |
| Ink of Example 4 | — | 100 | 100 | 100 |
| Glycerin | — | 100 | — | — |
| Diethylene glycol | — | — | 100 | — |
| Polyethylene glycol 600 | — | — | — | 100 |
| Viscosity [cP] | 2.3 | 10.1 | 8.7 | 33.9 |

Table 4 shows the pigment particle size in the undiluted ink of Example 4 without storage and the pigment particle size of each undiluted solution of Verification examples 1 to 3 after storage under heating at 60° C. for 48 hours, which were measured as described above. Comparing the measurement values, when the measurement value of the particle size in each of the verification examples was larger than that of the ink of Example 4, it was determined to be a poor solvent, and when the measurement value of the particle size in each of the verification examples was equal to or smaller than that of the ink of Example 4, it was determined to be a good solvent.

TABLE 4

Test results of solvents contained in ink of Example 4

| Measurement sample | Particle size in undiluted solution [nm] | Determination |
|---|---|---|
| Test example 1 (after storage under heating) | 71.2 | ○ |
| Test example 2 (after storage under heating) | 167.8 | X |
| Test example 3 (after storage under heating) | 160.7 | X |
| Ink of Example 4 (without storage) | 71.9 | — |

Conditions for storage under heating: 60° C., 48 hours
○: good solvent, X: poor solvent As shown in Table 4, the results of the method of determining a good solvent or poor solvent using verification samples obtained by diluting a prepared ink can confirm that glycerin (used in Verification example 1) was a good solvent, and diethylene glycol (used in Verification example 2) and polyethylene glycol 600 (used in Verification example 3) were poor solvents, as with the determination method shown in Table 1, that is, the same results were obtained by the above two different types of determination methods. Accordingly, it was confirmed that the method of using an actual ink to determine whether the solvent used therein is a good solvent or poor solvent to the coloring material contained therein is effective. Therefore, the above method for determining whether the used solvent is a good solvent or poor solvent using a sample obtained by diluting the ink can also effectively be used in the present invention.

Comparative Examples 1 to 17

(Preparation of Inks)

The above-described water-soluble organic solvents, pigment dispersion solutions 1 to 3, and components shown in Tables 5-1 to 5-3 were mixed. The obtained mixture was fully stirred for dissolution or dispersion, and it was then subjected to pressure filtration using a microfilter with a pore size of 3.0 μm (manufactured by Fuji Photo Film Co., Ltd.), so as to obtain inks of Comparative Examples 1 to 17.

TABLE 5-1

Composition of inks of Comparative Examples 1 to 6

| | | Composition of inks of Comparative Examples (% by mass) | | | | | |
|---|---|---|---|---|---|---|---|
| | | 1 | 2 | 3 | 4 | 5 | 6 |
| Water-insoluble coloring material | Pigment dispersion 1 | 50 | 50 | 50 | — | — | — |
| | Pigment dispersion 2 | — | — | — | 50 | 50 | 50 |
| | Pigment dispersion 3 | — | — | — | — | — | — |
| Water-soluble organic solvent | Good solvent | Glycerin | 5 | — | 5 | 5 | — | 5 |
| | | Ethylene glycol | — | — | 5 | — | — | 5 |
| | | Trimethylol propane | 7 | — | 5 | 7 | — | 5 |
| | Poor solvent | Diethylene glycol | — | — | — | — | — | — |
| | | Polyethylene glycol 600 | 10 | 15 | — | 10 | 15 | — |
| | | Polyethylene glycol derivative | — | — | — | — | — | — |
| Surfactant | Acetylene glycol EO adduct (*) | 0.1 | 0.1 | 0.1 | 0.1 | 0.1 | 0.1 |
| | Pure water | 27.9 | 34.9 | 34.9 | 27.9 | 34.9 | 34.9 |

(*) Product name: Acetylenol EH manufactured by Kawaken Fine Chemicals Co., Ltd.

TABLE 5-2

Composition of inks of Comparative Examples 7 to 12

| | | Composition of inks of Comparative Examples (% by mass) | | | | | |
|---|---|---|---|---|---|---|---|
| | | 7 | 8 | 9 | 10 | 11 | 12 |
| Water-insoluble coloring material | Pigment dispersion 1 | — | — | — | — | 50 | — |
| | Pigment dispersion 2 | — | — | — | — | — | 50 |
| | Pigment dispersion 3 | 50 | 50 | 50 | 50 | — | — |
| Water-soluble organic solvent | Good solvent | Glycerin | 5 | — | 5 | — | 3 | 3 |
| | | Ethylene glycol | — | — | 5 | — | — | — |
| | | Trimethylol propane | 7 | — | 5 | — | — | — |
| | Poor solvent | Diethylene glycol | — | — | — | — | — | — |
| | | Polyethylene glycol 600 | 10 | 15 | — | — | — | — |
| | | Polyethylene glycol derivative | — | — | — | — | 15 | 15 |
| Surfactant | Acetylene glycol EO adduct (*) | 0.1 | 0.1 | 0.1 | 0.1 | 0.1 | 0.1 |
| | Pure water | 27.9 | 34.9 | 34.9 | 39.9 | 31.9 | 31.9 |

(*) Product name: Acetylenol EH manufactured by Kawaken Fine Chemicals Co., Ltd.

TABLE 5-3

Composition of inks of Comparative Examples 13 to 17

| | | Composition of inks of Comparative Examples (% by mass) | | | | |
|---|---|---|---|---|---|---|
| | | 13 | 14 | 15 | 16 | 17 |
| Water-insoluble coloring material | Pigment dispersion 1 | — | 50 | — | — | — |
| | Pigment dispersion 2 | — | — | 50 | — | 50 |
| | Pigment dispersion 3 | 50 | — | — | 50 | — |
| Water-soluble organic solvent | Good solvent | Glycerin | 3 | 5 | 5 | 5 | 15 |
| | | Ethylene glycol | — | 8 | 8 | 8 | — |
| | | Trimethylol propane | — | — | — | — | — |
| | Poor solvent | Diethylene glycol | — | — | — | — | — |
| | | Polyethylene glycol 600 | — | 5 | 5 | 5 | — |
| | | Polyethylene glycol derivative | 15 | — | — | — | — |
| Surfactant | Acetylene glycol EO adduct (*) | 0.1 | 0.1 | 0.1 | 0.1 | 0.1 |
| | Pure water | 31.9 | 31.9 | 31.9 | 31.9 | 34.9 |

(*) Product name: Acetylenol EH manufactured by Kawaken Fine Chemicals Co., Ltd.

<Evaluation of Image Properties>

The inks of Examples 1 to 5 and Comparative Examples 1 to 17 were evaluated in terms of properties described below, using a modified ink jet recording apparatus BJS-700 (manufactured by Canon Inc.) having an on-demand multi-recording head, which applies thermal energy to ink in response to a recording signal so as to eject the ink. The obtained evaluation results regarding examples are shown in Table 6, and those regarding Comparative Examples are shown in Table 7.

1. Print Density

Using the above inks and the above ink jet recording apparatus, characters including a solid area of 2 cm×2 cm were printed on plain copy papers A to E described below. On the day following the printing, the print density of the solid area of 2 cm×2 cm was measured. The printer driver mode was a default mode. The setting of the default mode was shown below. The amount of ink ejected per ink dot was within 30 ng±10%.

Type of paper: plain paper

Printing quality: standard

Color adjustment: automatic

The print density obtained as a result of the above measurement was evaluated in accordance with the following criteria:

○: The average print density of the 5 papers was 1.4 or higher, and the print density of the paper with the lowest print density was 1.25 or higher.

Δ: The average print density of the 5 papers was 1.4 or higher, and the print density of the paper with the lowest print density was less than 1.25.

X: The average print density of the 5 papers was less than 1.4.

The following copy papers were used in the above printing test:

A: PPC paper NSF, manufactured by Canon Inc.,

B: PPC paper NDK, manufactured by Canon Inc.,

C: PPC paper 4024, manufactured by Fuji Xerox Co., Ltd.,

D: PPC paper Prober Bond, manufactured by Fox River Paper Co., and

E: Canon PPC paper, manufactured by Die Neusiedler AG.

2. Print density when printed with a small amount of ink

Print density with less ink was measured in the same manner as above except that the ejection amount of ink per dot was set within the range of 24 ng±10%. Thereafter, the obtained print density was evaluated according to the same criteria as above.

<Evaluation of Storage Stability>

Each of the ink of Examples 1 to 5 and Comparative Examples 1 to 17 was placed into a shot bottle and the bottle was hermetically closed. The bottle was then placed in an oven at 60° C. Two weeks later, the bottle was taken out and the state of the ink was then observed. The storage stability was evaluated in accordance with the criteria described below. The obtained evaluation results with inks of Examples are shown in Table 6, and those with inks of Comparative Examples are shown in Table 7.

○: Color materials contained in the ink are dispersed stably and uniformly.

X: The ink has become gel, or the upper portion thereof becomes transparent. or it is clearly thickened.

TABLE 6

Evaluation of Examples

| | Print density | | Storage stability |
|---|---|---|---|
| | Normal ejection of ink | Small ejection of ink | |
| Example 1 | ○ | ○ | ○ |
| Example 2 | ○ | ○ | ○ |
| Example 3 | ○ | ○ | ○ |
| Example 4 | ○ | ○ | ○ |
| Example 5 | ○ | ○ | ○ |

TABLE 7

Evaluation results of Comparative Examples

| | Print density | | Storage stability |
|---|---|---|---|
| | Normal ejection of ink | Small ejection of ink | |
| Comparative Example 1 | X | X | ○ |
| Comparative Example 2 | ○ | Δ | X |
| Comparative Example 3 | X | X | ○ |
| Comparative Example 4 | X | X | ○ |
| Comparative Example 5 | ○ | Δ | ○ |
| Comparative Example 6 | X | X | ○ |
| Comparative Example 7 | X | X | ○ |
| Comparative Example 8 | ○ | Δ | X |
| Comparative Example 9 | X | X | ○ |
| Comparative Example 10 | ○ | Δ | X |
| Comparative Example 11 | ○ | Δ | X |
| Comparative Example 12 | ○ | Δ | ○ |
| Comparative Example 13 | ○ | Δ | X |
| Comparative Example 14 | X | X | ○ |
| Comparative Example 15 | X | X | ○ |
| Comparative Example 16 | X | X | ○ |
| Comparative Example 17 | X | X | ○ |

<Measurement of Ink Landing on Plain Paper>
(Preparation of inks of Example and Comparative Examples for Measurement of Ink Landing)

The pigment dispersion solution 2 was used, and it was mixed with components shown in Table 8. The mixture was fully stirred for dissolution or dispersion, and it was subjected to pressure filtration using a microfilter with a pore size of 3.0 μm (manufactured by Fuji Photo Film Co., Ltd.), so as to obtain each of the inks of Example 6 and Comparative Examples 18 to 20. In preparation of these inks for ink landing measurement, a water-soluble dye C. I. direct blue 199 was used to visually observe the spread of the ink after it fixed on a recording medium. The surface tension of each of these inks is also shown in Table 8. The surface tension was measured with a tension meter CBVP-A3 manufactured by Kyowa Interface Science Co., Ltd., at a measurement temperature of 25.0±0.5° C., using a platinum plate of 10 mm×24 mm.

TABLE 8

Composition of inks of Example and Comparative Examples for measuring ink landing

| | | Composition (% by mass) | | | |
|---|---|---|---|---|---|
| | | Ex. 6 | Com. Ex. 18 | Com. Ex. 19 | Com. Ex. 20 |
| Water-insoluble coloring material | Pigment dispersion 1 | — | — | — | — |
| | Pigment dispersion 2 | 50 | 50 | 50 | 50 |
| | Pigment dispersion 3 | — | — | — | — |
| Water-soluble organic solvent | Good solvent | Glycerin | 7.5 | — | 15 | — |
| | | Ethylene glycol | — | — | — | — |
| | | Trimethylol propane | — | — | — | 7.5 |
| | Poor solvent | Diethylene glycol | — | — | — | — |
| | | Polyethylene glycol 600 | 7.5 | 15 | — | 7.5 |
| | | Polyethylene glycol derivative | — | — | — | — |
| Surfactant | Acetylene glycol EO adduct (*) | 0.1 | 0.1 | 0.1 | 0.1 |
| Water-soluble dye | C. I. Direct Blue 199 | 0.5 | 0.5 | 0.5 | 0.5 |
| | Pure water | 34.4 | 34.4 | 34.4 | 34.4 |
| Surface tension (mN/m) | | 39.5 | 39.6 | 39.4 | 40.1 |

(*) Product name: Acetylenol EH manufactured by Kawaken Fine Chemicals Co., Ltd.

<Measurement of Dot Diameter>

When the diameter of an ink dot obtained immediately after the ink landed on a plain paper is denoted by dI, the largest diameter of the ink spread after the ink fixed on the paper is denoted by dS, the largest diameter of the water-insoluble coloring material in the dot after the ink fixed on the paper is denoted by dC, and the penetration depth of the water-insoluble coloring material in the paper after the ink dried is represented by the penetration depth, the values of dI, dS, dC, and the penetration depth were measured by the following methods. First, the diameter dI of an ink dot immediately after the ink dot impacts a plain paper was measured using Face CONTACT-ANGLEMETER CA-P manufactured by Kyowa Interface Science Co., Ltd. Using a needle having a needle diameter of 28 G (inner diameter: 0.18 mm, and outer diameter: 0.36 mm), the tip of the needle was located at a height of 4 mm from the surface of the plain paper, ink was then dropped from the height onto the plain paper, and after the dropping, the diameter of an ink dot was read from the scale of the contact anglemeter. The above read value was used as the ink dot diameter dI immediately after the ink landed on a plain paper. The plain paper used in this test was a PB-Paper (NSK paper) manufactured by Canon Inc.

The largest diameter dS of the spread of the ink after the ink fixed on a recording medium, and the largest diameter dC of the water-insoluble coloring material in the ink after the ink fixed on a recording medium, were measured by dropping the ink dot on a plain paper under the above-described conditions and leaving it for 6 hours or more, and by measuring the respective largest linear dimensions after the ink dot was stabilized. The largest diameter dS of the ink dot after the ink fixed on a recording medium was obtained by measuring the largest linear dimension of the spread of cyan color of the water-soluble dye C. I. direct blue 199 that had been added to the ink. The largest diameter dC of the water-insoluble coloring material in the ink after the ink fixed on a recording medium was obtained by measuring the largest linear dimension of the spread of black hue of the pigment contained in the ink. Furthermore, when the largest diameter dC of the spread of the water-insoluble coloring material in the ink was measured, the dot form of the black pigment was also observed.

<Measurement of Penetration Depth of Water-Insoluble Coloring Material>

In order to measure the penetration depth of a water-insoluble coloring material, the water-soluble dye C. I. direct blue 199 was replaced with water in each of the inks of the above Example 6 and Comparative Examples 18 to 20. The thus obtained inks were then filtrated under the same conditions, so as to prepare new inks. Using these inks, printing was carried out on a PB-Paper (NSK paper) manufactured by Canon Inc., under the same conditions as in the above print density evaluation, using a modified ink jet recording apparatus BJS-700 (manufactured by Canon Inc.) having an on-demand multi-recording head, which applies thermal energy to ink in response to a recording signal so as to eject the ink. After completion of the printing and ink fixation, the printed area was sectioned from the backside thereof using a razor, and the cross section was observed with a microscope. The thickness (depth) of the water-insoluble coloring material distribution in the section of the paper was measured. From the obtained measurement results, evaluation was carried out in accordance with evaluation criteria described below. The obtained evaluation results and the measurement values of the largest diameter dC are shown in Table 9.

[Evaluation Criteria]
(Dot Diameter Relationship)
  ○: satisfying the relationship of dC<dI<dS
  X: not satisfying the relationship of dC<dI<dS
(Dot Form of Water-Insoluble Coloring Material)
1: Visual Observation from the Above of the Paper
  ○: the dot form of the water-insoluble coloring material is a perfect circle and an edge thereof is sharp.
  X: the dot form of the water-insoluble coloring material is not a perfect circle and an edge thereof is smeared.
2: Visual Observation from the Side of the Paper
  ○: the dot of the water-insoluble coloring material is present at almost the level of the paper surface.
  X: the dot of the water-insoluble coloring material is clearly rising from the surface of the paper.
(Penetration Depth of Water-Insoluble Coloring Material)
  ○: less than 30 μm
  X: 30 μm or larger

TABLE 9

Measurements of ink landing and the largest diameter of expansion of coloring material

| | | Ex. 6 | Com. Ex. 18 | Com. Ex. 19 | Com. Ex. 20 |
|---|---|---|---|---|---|
| Dot diameter relationship | | ○ | ○ | X | ○ |
| Dot shape of water- | 1. Observation from the above | ○ | ○ | X | ○ |

TABLE 9-continued

Measurements of ink landing and the largest diameter of expansion of coloring material

|  |  | Ex. 6 | Com. Ex. 18 | Com. Ex. 19 | Com. Ex. 20 |
| --- | --- | --- | --- | --- | --- |
| insoluble coloring material | 2. Observation from the side | ○ | X | ○ | ○ |
| Penetration depth of water-insoluble coloring material |  | ○ | ○ | X | X |
| The largest diameter dC [mm] by spreading of water-insoluble coloring material |  | 3.04 | 2.84 | 3.75 | 2.96 |

Figure 15:
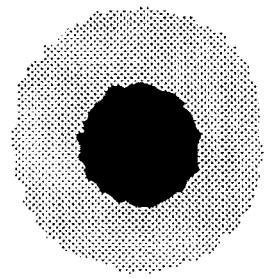
FIG. 15 schematically illustrates the difference in the ink dots of Examples and Comparative Examples after the ink fixed on a plain paper.
Figure 15:
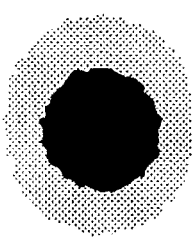
Figure 15:
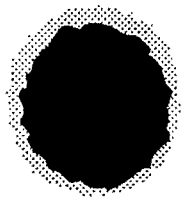
Figure 15:
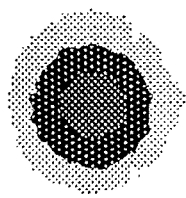
Figure 16:
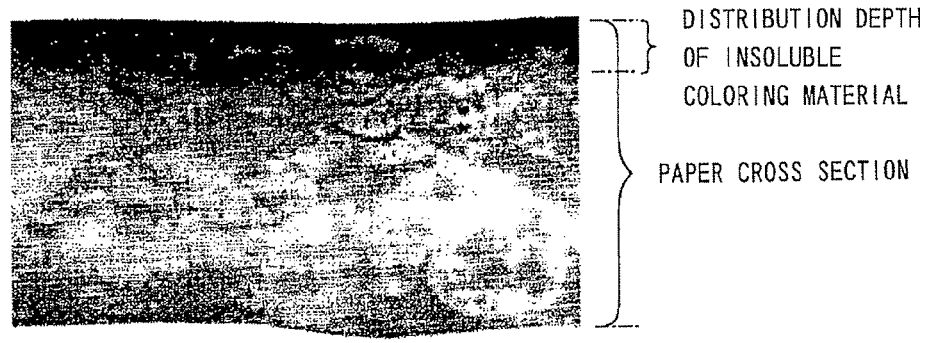
FIG. 16 is a schematic view showing the difference in the distribution of a coloring material in a depth direction after the inks of certain Example and Comparative Example fixed on a plain paper.
Figure 16:
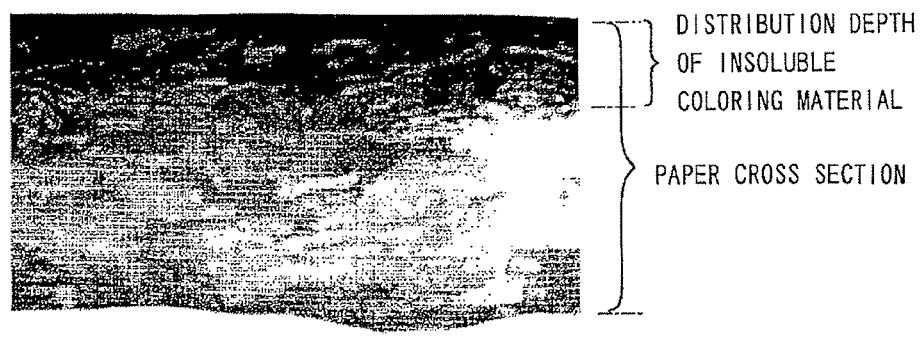

FIG. 15 schematically shows the look down view of the dots formed for the above measurement. FIG. 16 is a schematically drawn photomicrograph used to measure the expansion thickness (depth) of the water-insoluble coloring material in the section of the paper. As shown in FIG. 15 and Table 9, when the inks of Example 6 and Comparative Example 18 were used, the water-insoluble coloring material formed a perfect circle dot. In the case of Comparative Example 18, however, the water-insoluble coloring material rose from the surface of the paper, and thus, the surface of the paper was covered with an excessive amount of water-insoluble coloring material. Hence, when the ink of Example 6 was compared with that of Comparative Example 18, the coloring material effectively stayed near the surface of the paper. On the other hand, when the ink of Comparative Example 19 was used, the water-insoluble coloring material formed a dot with uneven spreading. Moreover, the water-insoluble coloring material was spread not only on the surface of the paper, but also in the depth direction of the paper, causing loss in the coloring material. Furthermore, when the ink of Comparative Example 20 was used, as shown in FIG. 15, the water-insoluble coloring material formed a perfectly circular dot. However, as is clear from the section of a printed area shown in FIG. 16, which was printed using an ink jet recording apparatus BJS-700 (manufactured by Canon Inc.), the coloring material was spread not only on the surface of the paper, but also in the depth direction of the paper. Thus, it was confirmed that in this case also, the coloring material was not effectively used.

As is apparent from the values of the largest diameter dC of the spread of the water-insoluble coloring material shown in Table 9, the ink of Example 6 containing both a poor solvent and a good solvent at an appropriate ratio had a larger spread of the water-insoluble coloring material than that of the ink of Comparative Example 18 containing only a poor solvent. From this fact, it was also confirmed that the pigment ink of the present invention has a sufficiently large area factor even with a small of ink droplet and forms an image having high OD (reflection density). In addition, inks not containing a surfactant were prepared by replacing the acetylene glycol EO adduct used as a surfactant with water in respective ink compositions of Example 6 and Comparative Example 18. These inks were measured on the dot diameter and the penetration depth of a water-insoluble coloring material under the same conditions of landing measurement on a plain paper carried out with the inks of Example 6 and Comparative Example 18. As a result, although the inks containing no surfactant required a longer fixation time after landing on the paper than the inks containing a surfactant, the ink containing both a poor solvent and a good solvent at an appropriate ratio achieved a larger spread of the water-insoluble coloring material than the ink containing only a poor solvent, providing the same relationship as inks containing a surfactant.

[Test Regarding Color Mixing (Bleeding) of Image]

Examples 7 to 16

The above-described inks of Examples 1 to 5 were used as the black ink in combination of color inks to form images. The color inks used herein (three colors, cyan, magenta and yellow) were prepared as follows.

(Preparation of Cyan Ink)

Components indicated below were mixed and fully stirred so that they were dissolved, and thereafter, the mixture was subjected to pressure filtration using a microfilter with a pore size of 0.2 μm (manufactured by Fuji Photo Film Co., Ltd.), so as to prepare cyan ink.

| DBL (direct blue) 199 | 3.5 parts |
| --- | --- |
| Glycerin | 7.5 parts |
| Diethylene glycol | 7.5 parts |
| Acetylenol E-100 | 1.0 part |
| Pure water | 80.5 parts |

(Preparation of Magenta Ink)

Magenta ink was prepared from the following components in the same manner as for the cyan ink.

| AR (acid red) 289 | 2.5 parts |
| --- | --- |
| Glycerin | 7.5 parts |
| Diethylene glycol | 7.5 parts |
| Acetylenol E-100 | 1.0 part |
| Pure water | 81.5 parts |

(Preparation of Yellow Ink)

Yellow ink was prepared from the following components in the same manner as described above.

| DY (direct yellow) 86 | 2.5 parts |
| --- | --- |
| Glycerin | 7.5 parts |
| Diethylene glycol | 7.5 parts |
| Acetylenol E-100 | 1.0 part |
| Pure water | 81.5 parts |

<Evaluation>

The black inks of Examples 1 to 5 and the above prepared colored inks were used in the combination as shown in Table 10 below, and printing was carried out by using these inks and an ink jet recording apparatus having an on-demand multi-recording head shown in FIG. 9 or 10, which applies thermal energy to ink in response to a recording signal so as to eject the ink. Thereafter, the print was evaluated. The obtained evaluation results are shown in Table 11.

TABLE 10

Types of the black ink and the head used for print evaluation

|  | Structure of head | Black ink |
| --- | --- | --- |
| Example 7 | FIG. 9 | Example 1 |
| Example 8 | FIG. 9 | Example 2 |
| Example 9 | FIG. 9 | Example 3 |

TABLE 10-continued

Types of the black ink and the head used for print evaluation

| | Structure of head | Black ink |
|---|---|---|
| Example 10 | FIG. 9 | Example 4 |
| Example 11 | FIG. 9 | Example 5 |
| Example 12 | FIG. 10 | Example 1 |
| Example 13 | FIG. 10 | Example 2 |
| Example 14 | FIG. 10 | Example 3 |
| Example 15 | FIG. 10 | Example 4 |
| Example 16 | FIG. 10 | Example 5 |

(Bleeding Properties)

The solid areas were formed by printing with a black ink and each of color inks (yellow, magenta and cyan), such that the areas were adjacent to one another by the recording method shown in FIGS. 9 and 10. The degree of bleeding on the border between the black ink and the color ink was visually observed, and evaluated in accordance with the criteria described below. The plain paper used herein was a PB-Paper (NSK paper) manufactured by Canon Inc. The evaluation results are shown in Table 11.

AA: Bleeding cannot be visually observed.
A: Bleeding is hardly recognized.
B: Bleeding is recognized, but the level is actually not problematic.
C: Bleeding is such that the border of the colors is unclear.

TABLE 11

Evaluation results

| | Bleed resistance |
|---|---|
| Example 7 | A |
| Example 8 | A |
| Example 9 | A |
| Example 10 | A |
| Example 11 | A |
| Example 12 | AA |
| Example 13 | AA |
| Example 14 | AA |
| Example 15 | AA |
| Example 16 | AA |

INDUSTRIAL APPLICABILITY

The water-based ink of the present invention is a pigmented ink which has a sufficiently large area factor even with a small ink droplet and achieves an image with high OD (reflection density). Moreover, using the ink of the present invention, an ink jet recording method for forming a high quality image with high OD even with a small application amount of the ink, an ink cartridge preferably used for the above recording method, a recording unit, and an ink jet recording apparatus are also provided. Furthermore, there is also provided an image forming method in which color mixing (bleed) is effectively prevented on the border between a black ink region and a color ink region without causing feathering, when a color image in which different colors are adjacent to one another is recorded on a plain paper.

What is claimed is:

1. An ink jet recording method comprising:
a step of ejecting a black ink and at least one water-based color ink to a plain paper provided as a recording medium,
wherein the black ink comprises water, a plurality of different water-soluble organic solvents, and a water-insoluble coloring material,
wherein the water-soluble organic solvents comprise at least one good solvent to the water-insoluble coloring material and a plurality of poor solvents to the water-insoluble coloring material,
wherein the total amount A (% by mass) of the good solvent or good solvents in the black ink and the total amount B (% by mass) of the poor solvents in the black ink are in a ratio A:B of from 10:5 to 7:9 both inclusive,
wherein at least one of the plurality of poor solvents is selected from the group consisting of diethylene glycol, polyethylene glycol, and 2-pyrrolidone,
wherein the water-insoluble coloring material is a self-dispersing pigment having at least one hydrophilic group attached onto a surface of a pigment particle via another group of atoms, wherein the black ink contains no resin dispersant,
wherein one of the plurality of poor solvents shows a Ka value determined by the Bristow method which is the largest among the Ka values of all the water-soluble organic solvents in the black ink, and
wherein a scanning operation for applying the at least one water-based color ink is performed after a scanning operation for applying the black ink is performed.

2. The ink jet recording method according to claim 1, wherein the water-insoluble coloring material comprises carbon black.

3. The ink jet recording method according to claim 1, wherein the hydrophilic group of the self-dispersing pigment is selected from the group consisting of —COOM1, —SO$_3$M1, and —PO$_3$H(M1)$_2$, where M1 represents any one selected from the group consisting of a hydrogen atom, an alkali metal, ammonium, and an organic ammonium.

4. The ink jet recording method according to claim 3, wherein the self-dispersing pigment comprises carbon black.

5. The ink jet recording method according to claim 1, wherein the at least one good solvent is selected from the group consisting of glycerin and ethylene glycol.

6. The ink jet recording method according to claim 1, wherein the ratio A:B is from 10:5 to 10:10.

7. The ink jet recording method according to claim 1, wherein the method comprises carrying out steps, in the following order, of:
applying the black ink to a predetermined region of the recording medium;
conveying the recording medium in a direction of paper feeding; and
applying the at least one water-based color ink to a predetermined region of the recording medium.

8. The ink jet recording method according to claim 1, wherein the black ink and the at least one water-based color ink are applied by giving thermal energy to the black ink and the at least one water-based color ink to generate a bubble to eject an ink droplet.

9. The ink jet recording method according to claim 1, wherein a scanning operation for applying the at least one water-based color ink is performed after a scanning operation for applying the black ink is performed and a single scanning time has further elapsed.

10. The ink jet recording method according to claim 9, wherein the water-insoluble coloring material comprises carbon black.

11. The ink jet recording method according to claim 9, wherein the at least one good solvent is selected from the group consisting of glycerin and ethylene glycol.

12. The ink jet recording method according to claim 9, wherein the ratio A:B is from 10:5 to 10:10.

13. The ink jet method according to claim 9, wherein an ink is applied by giving thermal energy to the ink to generate a bubble to eject an ink droplet.

14. The ink jet recording method according to claim 1, wherein the water-insoluble coloring material is present in an amount of 0.1% or more to 15% or less by mass based on the total mass of the black ink.

15. The ink jet recording method according to claim 1, wherein the water-insoluble coloring material is present in an amount of 1% or more to 10% or less by mass based on the total mass of the black ink.

16. The ink jet recording method according to claim 1, wherein the Ka value of the black ink is less than $1.5 \text{ ml/m}^2/\text{msec}^{1/2}$.

17. The ink jet recording method according to claim 1, wherein the Ka value of the black ink is $0.2 \text{ ml/m}^2/\text{msec}^{1/2}$ or more and less than $1.5 \text{ ml/m}^2/\text{msec}^{1/2}$.

18. The ink jet recording method according to claim 1, wherein the black ink further comprises a moisture retentive solid selected from the group consisting of urea, urea derivatives, trimethylolpropane, and trimethylolethane, and wherein the total amount of moisture retentive solid present in the black ink is within the range of 3.0% by mass and 10.0% by mass based on the total mass of the black ink.

* * * * *